United States Patent
Burnside et al.

(10) Patent No.: US 8,516,575 B2
(45) Date of Patent: Aug. 20, 2013

(54) SYSTEMS, METHODS, AND MEDIA FOR ENFORCING A SECURITY POLICY IN A NETWORK INCLUDING A PLURALITY OF COMPONENTS

(75) Inventors: Matthew Burnside, Columbia, MD (US); Angelos D. Keromytis, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 284 days.

(21) Appl. No.: 12/632,934

(22) Filed: Dec. 8, 2009

(65) Prior Publication Data

US 2010/0235879 A1    Sep. 16, 2010

Related U.S. Application Data

(63) Continuation-in-part of application No. PCT/US2008/066307, filed on Jun. 9, 2008.

(60) Provisional application No. 60/933,761, filed on Jun. 8, 2007.

(51) Int. Cl.
| | |
|---|---|
| *H04L 29/06* | (2006.01) |
| *G06F 11/00* | (2006.01) |
| *G06F 12/14* | (2006.01) |
| *G06F 12/16* | (2006.01) |
| *G08B 23/00* | (2006.01) |

(52) U.S. Cl.
USPC .............. 726/22; 726/23; 715/733; 715/764; 717/127

(58) Field of Classification Search
None
See application file for complete search history.

(56) References Cited

U.S. PATENT DOCUMENTS

| | | | |
|---|---|---|---|
| 7,085,683 B2 | 8/2006 | Anderson et al. | |
| 7,770,153 B2* | 8/2010 | Chilimbi et al. | .............. 717/127 |
| 2004/0064736 A1 | 4/2004 | Obrecht et al. | |
| 2004/0133672 A1 | 7/2004 | Bhattacharya et al. | |
| 2006/0156380 A1 | 7/2006 | Gladstone et al. | |
| 2007/0209074 A1* | 9/2007 | Coffman | ......................... 726/23 |
| 2007/0300170 A1* | 12/2007 | Bier et al. | ..................... 715/764 |
| 2008/0109730 A1* | 5/2008 | Coffman et al. | .............. 715/733 |
| 2008/0209552 A1* | 8/2008 | Williams et al. | ................ 726/22 |

OTHER PUBLICATIONS

A. D. Keromytis, S. Ioannidis, M. B. Greenwald, and J. M. Smith, "Managing access control in large scale heterogeneous networks," in Proceedings of the NATO NC3A Symposium on Interoperable Networks for Secure Communications (INSC), Nov. 2003.

(Continued)

*Primary Examiner* — Shin-Hon Chen
(74) *Attorney, Agent, or Firm* — Byrne Poh LLP

(57) ABSTRACT

Systems, methods, and media for enforcing a security policy in a network are provided, including, for example, receiving a plurality of events describing component behavior detected by a plurality of sensors, each sensor monitoring a different component of a plurality of components; attributing a first event of the plurality of events to a first principal; attributing a second event of the plurality of events to a second principal; determining whether the first and second events are correlated; storing a data structure that attributes each of the first and second events to the first principal, if it is determined that the first and second events are correlated; comparing the second event to the security policy; and modifying network behavior to enforce the security policy against the first principal based on the comparison of the second event to the security policy and the attribution of the second event to the first principal.

51 Claims, 13 Drawing Sheets

(56) References Cited

OTHER PUBLICATIONS

A. D. Keromytis, S. Ioannidis, M. B. Greenwald, and J. M. Smith, "The Strongman Architecture," in Proceedings of the 3rd DARPA Information Survivability Conference and Exposition (DISCEX III), pp. 178-188, Apr. 2003.
B. Lampson, "Protection," in Proceedings of the 5th Princeton Symposium on Information Sciences and Systems, pp. 473-443, Mar. 1971.
C. Ellison, "SPKI requirements," Request for Comments 2692, Internet Engineering Task Force, Sep. 1999.
C. Ellison, B. Frantz, B. Lampson, R. Rivest, B. Thomas, and T. Ylonen, "SPKI certificate theory," Request for Comments 2693, Internet Engineering Task Force, Sep. 1999.
C. Ribeiro, A. Zuquete, P. Ferreira, and P. Guedes, "Security policy consistency," 2000.
C. Rigney, A. Rubens, W. Simpson, and S. Willens, "Remote Authentication Dial in User Service (RADIUS)," Request for Comments (Proposed Standard) 2138, Internet Engineering Task Force, Apr. 1997.
D. F. Ferraiolo, R. S. Sandhu, S. Gavrila, D. R. Kuhn, and R. Chandramouli, "Proposed NIST Standard for Role-Based Access Control," ACM Transactions on Information and System Security (TISSEC), vol. 4, pp. 224-274, Aug. 2001.
D. Powell (Guest Ed.), "Group communication," Communications ACM, vol. 39, pp. 50-97, Apr. 1996.
G. S. Graham and P. J. Denning, "Protection: Principles and Practices," in Proceedings of the AFIPS Spring Joint Computer Conference, pp. 417-429, 1972.
International Preliminary Report on Patentability in International Application No. PCT/US08/66307, filed Jun. 9, 2008, mailed Dec. 23, 2009.
International Search Report in International Patent Application No. PCT/US08/66307, filed Jun. 9, 2008, mailed Nov. 10, 2008.
J. Hale, P. Galiasso, M. Papa, and S. Shenoi, "Security Policy Coordination for Heterogeneous Information Systems," in Proc. of the 15th Annual Computer Security Applications Conference (ACSAC), Dec. 1999.
J. Mogul, R. Rashid, and M. Accetta, "The Packet Filter: An Efficient Mechanism for User-level Network Code," in Proceedings of the Eleventh ACM Symposium on Operating Systems Principles, pp. 39-51, Nov. 1987.
J. Park and R. Sandhu, "The UCONABC usage control model," ACM Transactions on Information and System Security, vol. 7, pp. 128-174, Feb. 2004.
J. Schnizlein, J. Strassner, M. Scherling, B. Quinn, S. Herzog, A. Huynh, M. Carlson, J. Perry, and S. Waldbusser, "Terminology for Policy-Based Management," Request for Comments (Proposed Standard) 3198, Internet Engineering Task Force, Nov. 2001.
L. Cholvy and F. Cuppens, "Analyzing consistency of security policies," in RSP: 18th IEEE Computer Society Symposium on Research in Security and Privacy, 1997.
M. Blaze, J. Feigenbaum, and J. Lacy, "Decentralized Trust Management," in Proc. of the 17th Symposium on Security and Privacy, pp. 164-173, IEEE Computer Society Press, Los Alamitos, 1996.
M. Blaze, J. Feigenbaum, and M. Strauss, "Compliance Checking in the PolicyMaker Trust-Management System," in Proc. of the Financial Cryptography '98, Lecture Notes = in Computer Science, vol. 1465, pp. 254-274, Springer, Berlin, 1998.
M. Blaze, J. Feigenbaum, J. Ioannidis, and A. D. Keromytis, "The KeyNote Trust Management System Version 2." Internet RFC 2704, Sep. 1999.
M. Blaze, J. Feigenbaum, J. Ioannidis, and A. Keromytis, "The role of trust management in distributed systems security," in Secure Internet Programming, pp. 185-210.
M. Damianou, A Policy Framework for Management of Distributed Systems. PhD thesis, 2002.
M. Damianou, N. Dulay, E. Lupu, and M. Sloman, "The ponder policy specification language," Lecture Notes in Computer Science, vol. 1995, pp. 18-38, 2001.
M. Thompson, W. Johnston, S.Mudumbai, G. Hoo, K. Jackson, and A. Essiari, "Certificate-based access control for widely distributed resources," in Proceedings of the USENIX Security Symposium, pp. 215-228, Aug. 1999.
M. Vandenwauver et al, "Why enterprises need more than firewalls and intrusion detection systems," in IEEE 8th International Workshop on Enabling Technologies: Infrastructure for Collaborative Enterprises (WET ICE '99), Jun. 16-18, 1999, Stanford, CA, USA, pp. 152-157, Los Alamitos, CA, USA: IEEE Comput. Soc, 1999.
P. Bonatti, S. D. C. di Vimercati, and P. Samarati, "A Modular Approach to Composing Access Control Policies," in Proceedings of Computer and Communications Security (CCS) 2000, pp. 164-173, Nov. 2000.
P. Calhoun, A. Rubens, H. Akhtar, and E. Guttman, "Diameter Base Protocol," Internet Draft, Internet Engineering Task Force, Dec. 1999. Work in progress.
R. Choudhary, "A Policy Based Architecture for NSA RAdAC Model," in Proceedings of 6th IEEE Workshop on Information Assurance and Security, (United States Military Academy, West Point, NY), Jun. 2005.
R. Choudhary, "Compound Identity Measure: A New Concept in Information Assurance," in Proceedings of 7th IEEE Workshop on Information Assurance and Security, (United States Military Academy, West Point, NY), Jun. 2006.
R. Hayton, J. Bacon, and K. Moody, "Access Control in an Open Distributed Environment," in IEEE Symposium on Security and Privacy, May 1998.
R. S. Sandhu, E. J. Coyne, H. L. Feinstein, and C. E. Youman, "Role-based access control models," IEEE Computer, vol. 29, No. 2, pp. 38-47, 1996.
R. W. McGraw, "Securing Content in the Department of Defense's Global Information Grid," in Secure Knowledge Management Workshop, (State University of New York, Buffalo, NY), Sep. 2004.
S. Jajodia, P. Samarati, and V. S. Subrahmanian, "A logical language for expressing authorizations," in Proceedings of the 1997 IEEE Symposium on Security and Privacy, pp. 31-42, May 1997.
U.S. Appl. No. 60/933,761, filed Jun. 8, 2007.
Written Opinion in International Patent Application No. PCT/US08/66307, filed Jun. 9, 2008, filed Jun. 9, 2008, mailed Nov. 10, 2008.
Y. Bartal, A. Mayer, K. Nissim, and A. Wool, "Firmato: a novel firewall management toolkit," in Proceedings of the 1999 IEEE Symposium on Security and Privacy, pp. 17-31, May 1999.
Matthew Burnside and Angelos D. Keromytis. "Arachne: Integrated Enterprise Security Management," Proceedings of the 2007 IEEE Workshop on Information Assurance. United States Military Academy, West Point, NY, Jun. 20-22, 2007.
Matthew Burnside and Angelos Keromytis. Asynchronous Policy Evaluation and Enforcement, CSAW 08, Oct. 31, 2008, Fairfax, Virginia, USA.
Matthew Burnside and Angelos Keromytis. Path-based access control for enterprise networks. In 11th Information Security Conference (ISC2008), Sep. 2008. To appear.
"Promia Raven 1100 Appliance", Promia.com, Aug. 16, 2007, available at: http://www.promia.com/products_and_tools/raven/PromiaRaven1100.pdf.

* cited by examiner

| Incoming requests (560) | Policy rules (570) |
|---|---|
| (562) 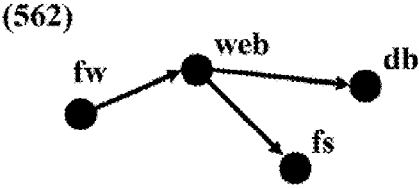 | (572) 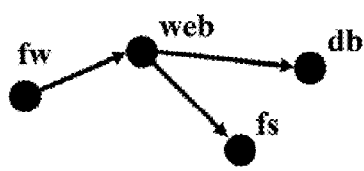 |
| (564) web  | (574) 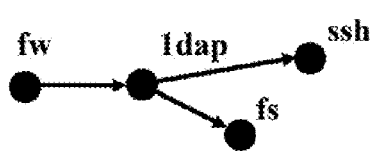 |
| (566)  | (576)  |
|  | (578)  |
FIG. 5B          FIG. 5C

| | |
|---|---|
| 6010 | sensor: add probe: link |
| 6020 | sensor: add probe: interface |
| 6030 | sensor: add probe: interface |
| 6040 | sensor: add probe: pf |
| 6050 | sensor: sensor ready |
| 6060 | sensor: 43227004 principal: [100] [] 128.59.23.218 |
| 6070 | sensor: dc1903c8 principal: [100] [] 128.59.21.161 |
| 6080 | sensor: b24838c4 principal: [100] ['128.59.23.218'] 128.59.21.161:80 |
| 6090 | sensor: e6dd6fc0 principal: [100] ['128.59.21.161'] 128.59.21.161:80 |
| 6100 | sensor: no linkage |
| 6110 | sensor: b10f4db6 if: 128.59.23.218:41229 > 128.59.21.161:80 2748218242 ['128.59.23.218:41229', '128.59.21.161:80'] |
| 6120 | sensor: c4641303 principal: [100] [] 10.0.0.11 |
| 6130 | sensor: b0992eb2 principal: [100] ['10.0.0.11'] 10.0.0.11:80 |
| 6140 | sensor: 94b0f8d0 if: 128.59.23.218:41229 > 10.0.0.11:80 2748218242 ['128.59.23.218:41229', '10.0.0.11:80', 'b10f4db6'] |
| 6150 | sensor: send 94b0f8d0 rlink 10.0.0.11 |
| 6160 | sensor: 56890187 pf: 128.59.23.218:41229 rdr 10.0.0.11:80 2748218242 ['128.59.23.218:41229', '10.0.0.11:80', 'b10f4db6', '94b0f8d0'] | with label 6061 pointing to row 6060.

7010 — sensor: add probe: link
7020 — sensor: add probe: httpd
7030 — sensor: add probe: interface
7040 — sensor: sensor ready
7050 — sensor: fa5e732e principal: [100] [] 128.59.23.218
7060 — sensor: 0a0e65a2 principal: [100] [] 10.0.0.11
7070 — sensor: 909b98ee principal: [100] ['128.59.23.218'] 128.59.23.218:41229
7080 — sensor: 9430d051 principal: [100] ['10.0.0.11'] 10.0.0.11:80
7090 — sensor: no linkage
7100 — sensor: 28c1348e if: 128.59.23.218:41229 > 10.0.0.11:80 2748218242 ['128.59.23.218:41229', '10.0.0.11:80']
7110 — sensor: recv 94b0f8d0 rlink 10.0.0.11
7120 — sensor: 06e1f8a9 httpd: 128.59.23.218:41229 get 10.0.0.11:80/ [not implemented] ['28c1348e', '94b0f8d0']

FIG. 7

SYSTEMS, METHODS, AND MEDIA FOR ENFORCING A SECURITY POLICY IN A NETWORK INCLUDING A PLURALITY OF COMPONENTS

CROSS-REFERENCE TO RELATED APPLICATION

This application is a continuation-in-part of International Application No. PCT/US2008/066307, filed Jun. 9, 2008, which claims the benefit of U.S. Provisional Patent Application No. 60/933,761, filed Jun. 8, 2007, which is are hereby incorporated by reference herein in their entireties.

STATEMENT REGARDING FEDERALLY SPONSORED RESEARCH OR DEVELOPMENT

This invention was made with government support under Grant Nos. CNS07-14647, CNS-06-27473, and CNS-04-26623 awarded by the National Science Foundation and Grant No. N00014-07-1-0907 awarded by the Office of Naval Research. The government has certain rights in the invention.

TECHNICAL FIELD

The disclosed subject matter relates to systems, methods, and media for enforcing a security policy in network including a plurality of components.

BACKGROUND

Computer viruses, worms, trojans, hackers, malicious executables, probes, etc. can be a menace to users of digital processing devices connected to public computer networks (such as the Internet) and/or private networks (such as corporate computer networks). In response to these threats, various networks employ protective measures, such as, antivirus software, logging, firewalls, honeypots, roll-back/recovery, and/or intrusion detection systems, etc. However, these protective measures are not always adequate.

Security policies (e.g., policies developed by a system administrator for responding to attacks) can provide guidance for various protective measures. However, typical mechanically-enforced security policies can be limited to traditional admission-based access control and policy enforcement can be limited to allow/deny semantics that can be insufficient in providing the desired protection. This can, for example, be because the focus of the protection is on protecting a specific component in response to a specific attack on that component without also enacting network wide protection. For example, locking the username/password of a user who has repeatedly provided the wrong password does not, for example, prevent that user from attempting to access portions of a system not secured by that username/password. Access-control mechanisms that operate independently on each service can lead to inconsistent or incorrect application of an intended system-wide policy.

Accordingly, it is desirable to provide systems, methods, and media that overcome these and other deficiencies of the prior art.

SUMMARY

Some embodiments provide systems, methods, and media for enforcing a security policy in a network including a plurality of components. In some embodiments, a method for enforcing a security policy in a network including a plurality of components is provided. The method including: receiving a plurality of events describing component behavior detected by a plurality of sensors, each sensor monitoring a different component of the plurality of components; attributing a first event of the plurality of events to a first principal; attributing a second event of the plurality of events to a second principal; determining whether the first and second events are correlated; storing a data structure that attributes each of the first and second events to the first principal, if it is determined that the first and second events are correlated; comparing the second event to the security policy; and modifying network behavior to enforce the security policy against the first principal based on the comparison of the second event to the security policy and the attribution of the second event to the first principal.

In some embodiments, a system for enforcing a security policy in a network including a plurality of components is provided. The system including a processor that: receives a plurality of events describing component behavior detected by a plurality of sensors, each sensor monitoring a different component of the plurality of components; attributes a first event of the plurality of events to a first principal; attributes a second event of the plurality of events to a second principal; determines whether the first and second events are correlated; stores a data structure that attributes each of the first and second events to the first principal, if it is determined that the first and second events are correlated; comparing the second event to the security policy; and modifies network behavior to enforce the security policy against the first principal based on the comparison of the second event to the security policy and the attribution of the second event to the first principal.

In some embodiments, a non-transitory computer-readable medium containing computer-executable instructions that, when executed by a processor, cause the processor to perform a method for enforcing a security policy in a network including a plurality of components is provided. The method including: receiving a plurality of events describing component behavior detected by a plurality of sensors, each sensor monitoring a different component of the plurality of components; attributing a first event of the plurality of events to a first principal; attributing a second event of the plurality of events to a second principal; determining whether the first and second events are correlated; storing a data structure that attributes each of the first and second events to the first principal, if it is determined that the first and second events are correlated; comparing the second event to the security policy; and modifying network behavior to enforce the security policy against the first principal based on the comparison of the second event to the security policy and the attribution of the second event to the first principal.

In some embodiments, a method for enforcing a security policy in a network including a plurality of components is provided. The method including: receiving the security policy having a plurality of policy rules, wherein the plurality of policy rules are represented by a corresponding plurality of policy graphs, wherein each vertex in the plurality of policy graphs has attributes describing an event, and wherein each of the plurality of policy rules has a corresponding actuator; receiving a plurality of requests; modeling the plurality of requests, wherein a graph of each request is generated; comparing the graph of each request with the plurality of policy graphs; and in response to detecting a deviation from one of the plurality of policy graph, activating the corresponding actuator.

In some embodiments, a system for enforcing a security policy in a network including a plurality of components is provided. The system including a processor that: receives the security policy having a plurality of policy rules, wherein the plurality of policy rules are represented by a corresponding plurality of policy graphs, wherein each vertex in the plurality of policy graphs has attributes describing an event, and wherein each of the plurality of policy rules has a corresponding actuator; receiving a plurality of requests; models the plurality of requests, wherein a graph of each request is generated; comparing the graph of each request with the plurality of policy graphs; and in response to detecting a deviation from one of the plurality of policy graph, activates the corresponding actuator.

In some embodiments, a non-transitory computer-readable medium containing computer-executable instructions that, when executed by a processor, cause the processor to perform a method for enforcing a security policy in a network including a plurality of components is provided. The method including: receiving the security policy having a plurality of policy rules, wherein the plurality of policy rules are represented by a corresponding plurality of policy graphs, wherein each vertex in the plurality of policy graphs has attributes describing an event, and wherein each of the plurality of policy rules has a corresponding actuator; receiving a plurality of requests; modeling the plurality of requests, wherein a graph of each request is generated; comparing the graph of each request with the plurality of policy graphs; and in response to detecting a deviation from one of the plurality of policy graph, activating the corresponding actuator.

In some embodiments, a method for enforcing a security policy in a network including a plurality of components is provided. The method including: receiving a request; processing the request at a first node, wherein a sensor monitors a plurality of events generated at the first node; associating information relating to the plurality of events with a graph representing interactions of the request with the network; and transmitting the information relating to the plurality of events and the graph to a neighboring second node, wherein the second node evaluates the request against the security policy using the transmitted information.

In some embodiments, a system for enforcing a security policy in a network including a plurality of components is provided. The system including a processor that: receives a request; processes the request at a first node, wherein a sensor monitors a plurality of events generated at the first node; associates information relating to the plurality of events with a graph representing interactions of the request with the network; and transmits the information relating to the plurality of events and the graph to a neighboring second node, wherein the second node evaluates the request against the security policy using the transmitted information.

In some embodiments, a non-transitory computer-readable medium containing computer-executable instructions that, when executed by a processor, cause the processor to perform a method for enforcing a security policy in a network including a plurality of components is provided. The method including: receiving a request; processing the request at a first node, wherein a sensor monitors a plurality of events generated at the first node; associating information relating to the plurality of events with a graph representing interactions of the request with the network; and transmitting the information relating to the plurality of events and the graph to a neighboring second node, wherein the second node evaluates the request against the security policy using the transmitted information.

In some embodiments, a method for creating security policies in a network including a plurality of components is provided. The method including: monitoring a plurality of requests, wherein a plurality of events associated with each of the plurality of requests is generated at a plurality of nodes; modeling the plurality of requests and the plurality of events, wherein a representation of each of the plurality of requests is generated; transmitting the representation to an administrator node; receiving a modified representation from the administrator node; and generating a security policy having a plurality of policy rules in response to receiving the modified representation, wherein the plurality of policy rules reflect the modified representation.

In some embodiments, a system for creating security policies in a network including a plurality of components is provided. The system including a processor that: monitors a plurality of requests, wherein a plurality of events associated with each of the plurality of requests is generated at a plurality of nodes; models the plurality of requests and the plurality of events, wherein a representation of each of the plurality of requests is generated; transmits the representation to an administrator node; receives a modified representation from the administrator node; and generates a security policy having a plurality of policy rules in response to receiving the modified representation, wherein the plurality of policy rules reflect the modified representation.

In some embodiments, a non-transitory computer-readable medium containing computer-executable instructions that, when executed by a processor, cause the processor to perform a method for creating security policies in a network including a plurality of components is provided. The method including: monitoring a plurality of requests, wherein a plurality of events associated with each of the plurality of requests is generated at a plurality of nodes; modeling the plurality of requests and the plurality of events, wherein a representation of each of the plurality of requests is generated; transmitting the representation to an administrator node; receiving a modified representation from the administrator node; and generating a security policy having a plurality of policy rules in response to receiving the modified representation, wherein the plurality of policy rules reflect the modified representation.

BRIEF DESCRIPTION OF THE DRAWINGS

FIGS. 5B-C are simplified illustrations of graphs generated for a set of requests and graphs generated for a set of policies in accordance with some embodiments of the disclosed subject matter.

FIG. 6 is a log file generated by firewall sensors in accordance with some embodiments of the disclosed subject matter.

FIG. 7 is a log file generated by web server sensors in accordance with some embodiments of the disclosed subject matter.

DETAILED DESCRIPTION

Some embodiments provide systems, methods, and media for enforcing a security policy in a network including a plurality of components. Some embodiments can observe and detect malicious behavior on a network, determine what entity is responsible for the behavior, determine what enforcement action is indicated in policy information, and initiate the indicated enforcement action. Some embodiments can provide sensors that observe behavior on a network, including software and interfaces, and generate events in response to the behavior. Some embodiments can determine and store various relationships between entities and the behavior described in events, such as, for example, which program and/or interface was responsible for behavior that caused an event to be posted. Events can be evaluated based on policy information and the behavior of software and/or interfaces can be controlled based on the evaluation. Some embodiments can provide network-wide protection in response to an attack on one component of a network.

More particularly, systems, methods, and media for asynchronous policy evaluation are provided. In asynchronous policy evaluation, a policy can be re-evaluated against a request at any node at any time. These embodiments provide a back channel (e.g., a database) for collecting and linking policy-related events and then asynchronously evaluates a global policy against that database.

Figure 1:
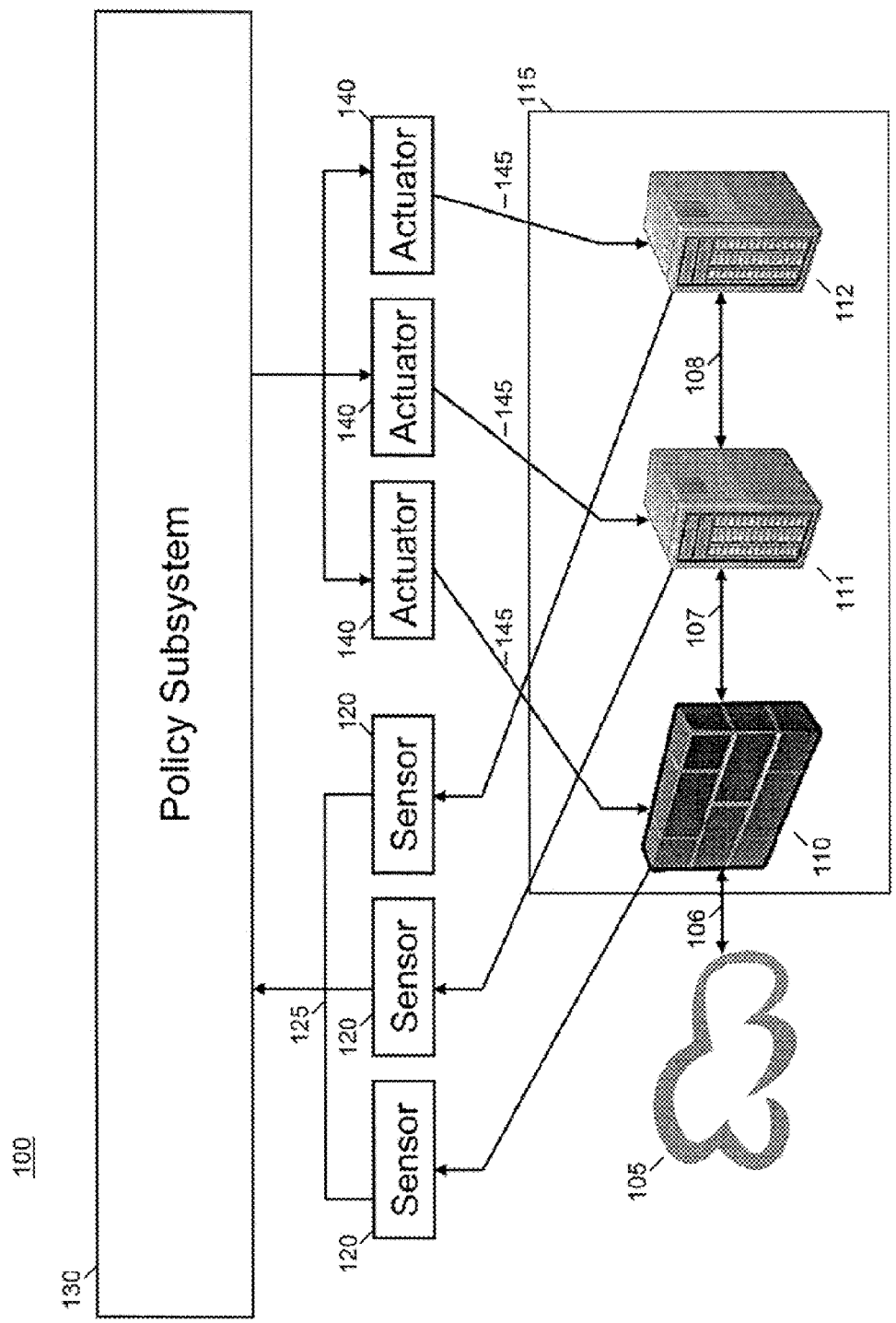
FIG. 1 is a simplified illustration of a system for enforcing a security policy in a network including a plurality of components in accordance with some embodiments of the disclosed subject matter.

FIG. 1 illustrates a system, in accordance with some embodiments, including a network 105 in communication through connection 106 with a network 115 that includes a firewall 110, a web server 111, and a database 112 in communication through interfaces 107 and 108. FIG. 1 also illustrates sensors 120 that monitor behavior taking place on interfaces 106, 107, and 108, as well as in firewall 110, web server 111, and database 112. Sensors 120 can post events 125 in the policy subsystem 130 that describe the monitored behavior. Events can be evaluated based on a policy by the policy subsystem 130. The policy can be, for example, predetermined, dynamic, and/or controlled by a system administrator. Depending on the evaluation, actuators 140 can be notified that an entity or entities responsible for the monitored behavior should have the security policy enforced against them. Enforcement can include, for example, modifying the behavior of, for example, interfaces 106, 107, and 108, firewall 110, web server 111, and database 112. Enforcement can be positive and negative, for example, in some embodiments, enforcement can include rewarding a principal for benign behavior as well as punishing it for malicious behavior.

For example, a sensor 120 can observe and post events 125 describing repeated attempts to access private information on database 112 by a user connected to system 115 through interface 106. Based on policy 130, actuators 140 can be instructed, for example, to lock database access for the user, drop the connection of the user at 106, have firewall 110 deny all further communications from the user, and kill the user's processes on web server 111.

Figure 2:
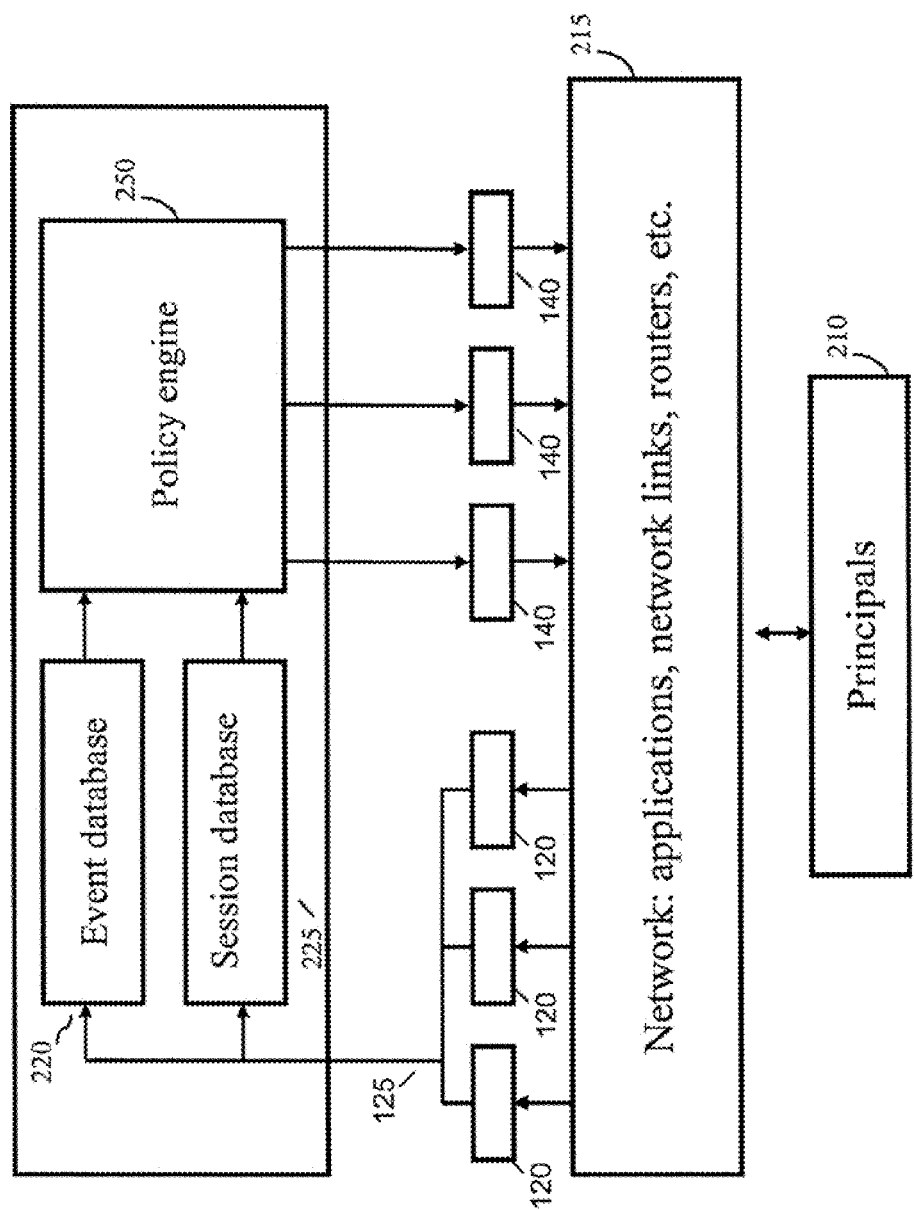
FIG. 2 is another simplified illustration of a system for enforcing a security policy in a network including a plurality of components in accordance with some embodiments of the disclosed subject matter.

Referring to FIG. 2, sensors 120 can monitor various systems components, such as, software (e.g., web browsers, web servers, print drivers, network drivers, word processors, operating systems, etc.) and/or interfaces (e.g., network links, input/output devices, etc.) and can generate events 125 describing observed behavior (e.g., actions or lack thereof). In some embodiments, a detection system, such as, for example, an intrusion detection system (IDS) can be used as a sensor 120. Sensors 120 can be implemented in software and can be configured for a particular component to be monitored. For example, a sensor 120 that is monitoring a web server 111 can be configured to parse web requests and server logs. Sensors 120 detect session-related events 125 and reports events 125 to the session database. In another example, a link sensor includes network taps at both ends of a link on the network. Each link sensor can maintain a TCP connection with its sibling and can use that link to update the sibling regarding the creation and destruction of TCP sessions, transmit linkage information, etc.

Events 125 can be any action generated by a sensor in response to the sensor observing behavior in the network. In some embodiments, events 125 can be data structures passed between and/or accessible by, for example, sensors 120, a policy engine 250, and actuators 140. Events can be posted in response to behavior that is relevant to a policy decision stored in policy 130. Examples of actions for which events 125 can be posted include, for example, authenticating a user, initiating a network connection, and requesting a file. Events 125 can be positive or negative, for example, an event can be posted in response to a firewall accepting a connection, a firewall rejecting a connection, and/or a long period passing without activity being observed.

In some embodiments, sensors 120 can be implemented using a scripting language, such as, for example, Python, and events 125 can be defined to include certain standard fields which can be expanded on by various sensors if needed. For example, a sensor that monitors an Apache web server can be defined as:

```
e = DataEvent({'src': src,
    'dst': dst,
    'app': "httpd",
    'method': m.group('method').lower( ),
    'path': m.group('page'),
    'link_field': self.conf['link']
    }).
```

In this example, "src" (source) defines an address of a host where the request originated; "dst" (destination) defines an address of the host where the request was processed; "app" (application) defines the type of application receiving the request (e.g., Apache); "method" signifies the type of request (e.g., GET, PUT, etc); "path" signifies the specific file targeted by the request (e.g., index.html), and "link_field" signifies a list of the event identification numbers to which this event is known to be causally linked.

For example, sensor 120 for an Apache web server parses the log file access_log, where each entry in the log file represents a step taken by the web server in response to a request. For each entry, Apache sensor 120 generates an event to report to the session database (e.g., session database 225). An event representing an HTTP GET request on the file/index.html can be described as:

```
{ 'app': "httpd",
  'src': 10.23.1.2:234,
  'dst': 10.1.2.3:80,
  'method': "GET",
  'path': "/index.html",
}
```

In another example, an event representing a redirected TCP connection on an OpenBSD PF firewall can be described as:

```
{ 'app': "pf",
  'src': 10.23.1.2:234,
  'dst': 10.1.2.3:80,
  'method': "RDR",
  'seqnum': 3851915398,
}
```

It should be noted that, while sensor 120 is generally described as being targeted, associated, and/or customized with a particular instance of an application such that each sensor has been preconfigured to observe and report on the policy-related activities of its specific application, this is illustrative. For example, sensors can be general. Any alerts generated by an event-reporting system, such as an intrusion detection system, can be translated into events.

In some embodiments, sensors can be categorized or grouped into sensor groups, where events are multiplexed through a group handler and processed by a correlation engine prior to being reported to the session database (e.g., session database 225). For example, a sensor group can include the sensors associated with the particular services on a single host.

The correlation engine generates linkages between events 125 by detecting correlations between their attributes. For example, if the TCP sequence number of an incoming connection on an internal web server is reported by a link sensor (ID do 1903c8) and corresponds to the TCP sequence number reported by the firewall redirect (ID b24838c4), the correlation engine can infer that events do 1903c8 and b24838c4 are causally related. In response, the correlation engine assigns an attribute to the firewall redirect that indicates that the link sensor event is a successor. This can be represented by, for example:

{'succ': [dc1903c8]}

The causality information can be generated at the sensor level and associated with the corresponding events before delivery to the session database. When an event is generated by a sensor 120 and sent to the session database 225, the event contains its successor information (e.g., a list of the 32-bit identifiers, $p_1 \ldots p_n$). Session database 225 then inserts the event into the appropriate location in the session graphs.

It should be noted that the correlation engine can attempt correlations between events based on arbitrary fields, such as source or destination IP:port, TCP sequence number, timing, etc. It should also be noted that each sensor can facilitate correlations by providing hits to the correlation engine on which fields are appropriate. For example, when generating events relation to TCP sessions, the firewall sensor indicates that correlation on the TCP sequence should be attempted first.

It should further be noted that, in the process of handling a request, a service forwards that request onto a downstream service that is situated on another host, where the creation of the TCP session for that forward is detected by a link sensor on the originating service using its network tap. This link sensor forwards to its sibling link sensors on the target service the successor information for the incoming session. Accordingly, successor information is passed from sensor group to sensor group as a request propagates through the network.

A policy can be stored in and implemented by the policy subsystem 130 using various systems and methods. For example, a policy can include a list of objectives, rules for behavior, requirements, and responses whose goals include improving the security of a network 115. One example entry in a policy is "all incoming requests must connect on port 80 and can only request file named index.html." A policy distributed across various network components can be referred to as a global policy.

Actuators 140 can enforce a security policy against principals by, for example, modifying application behavior after being triggered by the policy subsystem 130 in response to policy rules. Actuators 140 can be implemented in hardware and/or software and can be specifically configured for a particular component to be controlled. For example, an actuator can close a port on firewall 110, turn on a logging database 112, redirect requests to a web page on web server 111, kill a process, lock a user's username, deny file access, activate an IDS, divert to a honeypot, alert a systems administrator, etc.

In some embodiments, events generated as a result of an actuator can be disabled, actuators can be allowed to affect only a single session, and/or sensors can ignore actuator instigated actions. For example, if an actuator turns off port 80 in response to an attack, a sensor that monitors port 80 can ignore that the port was turned off. This can inhibit, for example, the actions of an actuator from causing a cascade of events and responses that can be undesirable in some embodiments. In some embodiments, actuators 140 can post events indicating what action they are about to take. Sensors 120 can observe these events and ignore the action taken by the actuators instead of posting events in response to observing the actions.

Behavior on system 100 can be the result of actions taken by various entities (e.g., a user, a client, a server, a process, etc.). A principal 210 is an identifier of such an entity. Various types of principals can be used in various embodiments depending on, for example, the type entity being identified. A principal 210 can include, for example, addresses (e.g., a MAC address, a TCP/IP address, etc.), keys and/or tokens (e.g., a SecurID token, USB token, Bluetooth token, etc.) and/or a physical identifier (e.g., a fingerprint or retina scan), etc. At a network level a principal can be, for example, an IP address and at an application level, a principal can be a username/password pair or a public/private key pair.

Network 215 can be monitored by sensors 120 which post events 125. Events 125 can be stored using various systems and methods. For example, events can be stored in a database including, an event database 220 for storing events and a session database 225 for linking events into sessions (and to principals). A session can be defined as behavior relating to a principal taking place from the time the principal connects to a network (e.g., logs on, begins requesting files, etc.) until the time the principal leaves the network (e.g., logs off, completes all pending requests, etc.). The event database can be searched to return results to queries such as, "list all events with a destination port of 22." Session database 225 can return results to queries such as, "return a graph of all events resulting from principal 10.1.2.3." Policy engine 250 can examine event database 220 and session database 225 and make decisions based on the security policy whether to alert actuators 140. Policy engine 250 can be, for example, centralized and distributed across various components. Policy engine 250 can include and/or interact with existing policy mechanisms, such as, for example, htaccess files, MySQL grant tables, access control lists (ACLs), role-based access control (RBAC) etc. Policy engine 250 can, for example, override existing policy mechanisms, defer to existing policy mechanisms, or compromise between various policies by, for example, allowing the existing policy mechanism to be followed and making corrections or changes when required by a global policy.

Alternatively or additionally, the system of FIG. 2 can use events 125 and/or any other suitable information obtained by sensors 120 to build and/or maintain a model describing the current state of each request made on the network. In this embodiment, the state of each request is a session and the session models can be stored in session database 225. To determine the access level permitted to each session, each is evaluated by policy engine 250 against a policy.

Figure 3:
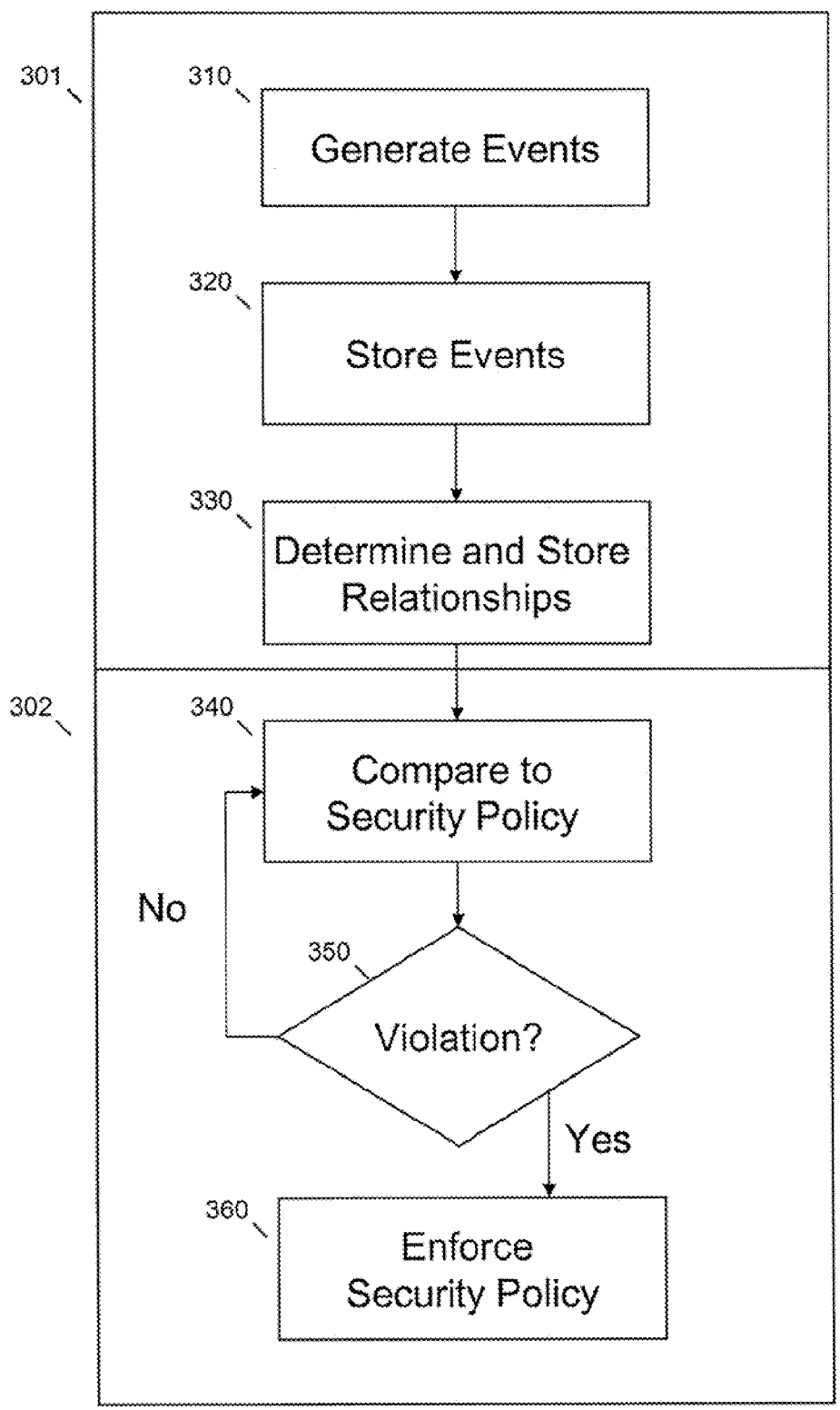
FIG. 3 is a simplified illustration of a method for enforcing a security policy in a network including a plurality of components in accordance with some embodiments of the disclosed subject matter that can be performed on the systems of FIG. 1 or FIG. 2.

FIG. 3 illustrates a method for enforcing a security policy in network 215 including information gathering, at 301, and enforcement, at 302. Events 125 can be generated, at 310, by, for example, sensors 120. At 320, events 125 can be stored in event database 220. At 330, various relationships between events and/or principals can be determined and stored in session database 225. For example, an event can be attributed to a principal that directly caused the behavior the event described; events can be correlated with each other based on, for example, sharing common information (e.g., sequence ID numbers, process ID numbers, etc.); events can be attributed to principals that indirectly caused the behavior the event describes, etc. Correlation can also be based on, for example, ports (e.g., TCP, UDP, etc.), addresses (e.g., source or destination MAC addresses, etc.), timing relationships, function-call graphs, and/or taint graphs, etc. In some cases, it can be determined, for example, that a single principal is responsible for different behavior monitored by different sensors of different components. For example, a firewall entry with an IP address principal and a database read with a username principal can be correlated to each be the result of behavior from the IP address principal.

Events 1125 can be compared, at 340, to a security policy by policy engine 250. Based on this comparison, as well as on the correlations stored in session database 225, it can be determined, at 350, whether there has been a violation of the security policy. Each of information gathering, at 301, and enforcement, at 302 can run, for example, continually, periodically, and/or at the discretion of a systems administrator. In some embodiments, storing events, at 320, and determining and storing relationships, at 330, can be combined and/or performed in various orders. In some embodiments, relationships can be determined based on information stored in, for example, event database 220 and session database 225.

Some embodiments can maintain a score for principals 210. A score can be modified based on, for example, events linked to the principal through its sessions. For example, in some embodiments each principal can be retained in event database 220 along with a score. Each principal can start with a score of, for example, 100, which can also be the maximum score. When events 125 with non-zero penalty values are correlated, at 320, with a principal, the score of the principal can be reduced by the non-zero penalty value and the updated score can be stored, at 330, in event database 220.

Penalty values can depend on various factors. For example, for a first application, a failed password may be relatively unimportant and thus result in a small penalty (e.g. an incorrect password at a web mail login). However, for another application it may be considered a significant indication of misbehavior and thus result in a large penalty (e.g., a "su root" on a machine hosting a web server). Penalty values can be communicated using various methods, for example, sensors can attach penalty values to events before posting them or a policy engine 250 can determine penalty values after receiving an event. In embodiments where scores are associated with sessions, for example, a session can be treated as having the score of the lowest scoring principal linked to it.

In some embodiments, a forgiveness server can be provided to allow for rehabilitation of a principal's score. When a principal is blocked by an actuator from taking some action, the entity associated with the principal can be instructed (or redirected) to visit the forgiveness server. The forgiveness server can be a web server that examines the score of the principal and, based on its value, provides rehabilitation instructions that the entity associated with the principal can perform to bring the principal's score back to 100 (or at least to increase it by a specified amount). For example, to be forgiven a score of 95, the entity associated with the principal can reply to an automated e-mail; to be forgiven a score of 75, the entity can submit his or her social security number; to be forgiven a score of 50, the entity can fill out a form explaining his or her behavior and submit his or her credit card number; and to be forgiven a score of 10, the entity can speak with a system administrator on the phone. Various actions can be required of various principals to receive forgiveness and be rehabilitated and these actions can depend on, for example, configurations, principal type, application type, etc. A forgiveness server can be implemented in software and can be part of or in communication with the policy engine 250.

Actuators can be configured to react based on various ranges of scores being associated with principals 210. For example, when a session enters a new range, the actuator can trigger, at 350, policy enforcement, at 360. Consider, for example, an actuator configured to increase a log level for sessions with scores between 0 and 95. If a session with a score of 100 fails a password authentication and this causes the generation of an event with a penalty value of 10, the session score drops to 90 and an actuator can be triggered to increase log levels.

In some embodiments, a session can be represented as a graph, G=(V, E), where the vertices V are events 125 and the edges E are causality links between the events. Sensors 120 can be used to build a graph by posting events 125 describing links that indicate causal links between other events 125. For example, a TCP connection can arrive at a firewall from some IP:port (a firewall sensor can generate an incoming connection event) and can leave through IP:otherport (the firewall sensor can generate a departing connection event), and the firewall sensor can also generate an event indicating that the previous two events are causally linked. These three events can be processed by the session database to build a graph, the first two events are the initial two vertices and the third event represents the link between them.

Links can be across a single layer (e.g., as in the above firewall example) and across levels of a network/application stack. A linkage of the latter type can be, for example, a TCP connection arriving at a web server that is causally linked with application-layer behavior of responding to a request on that TCP connection. Two principals that are linked (e.g., a first principal being an IP address and second principal being a username/password entered from connection from this IP address) can be treated as one principal for purposes of enforcing policy. For example, if the username/password principal is determined to be attacking a web server, the connection from the IP address can be blocked at a firewall. When a portion of a session (e.g., a TCP connection) disconnects or otherwise terminates, a sensor can generate an unlink event. In response, a session graph can be modified, by, for example, deleting nodes and links to remove the terminated connection.

In some embodiments, behavior at interfaces on the perimeter of a network can create session ID's. For example, a sensor on interface 106 can create a new session ID when it observes communication from an unknown principal. The session ID can be included in events describing behavior associated with that principal. In some embodiments, sequence IDs can be used to link various events. For example, a firewall, such as firewall 110, typically includes a sequence number in internal and departing communications. When a sensor on the outgoing interface 107 of firewall 110 observes a communication to web server 111 for which it knows the session ID is "X," the firewall sensor can alert a sensor on the incoming interface 107 of web server 111 that an incoming communication with that sequence number is part of session "X."

In some embodiments, events can be cached and posted in bunches after being processed. For example, an event cache can be positioned between sensors 120 and databases 220/225. The cache can store events and sequence ID's can be added to them while in the cache. The events can be posted to the databases for example, periodic basis, after the cache holds a certain number of events, and/or after each event has a session ID. For example, an event describing a firewall entry can be held in the cache until an event describing a corresponding firewall exit is also posted.

Figure 4A:
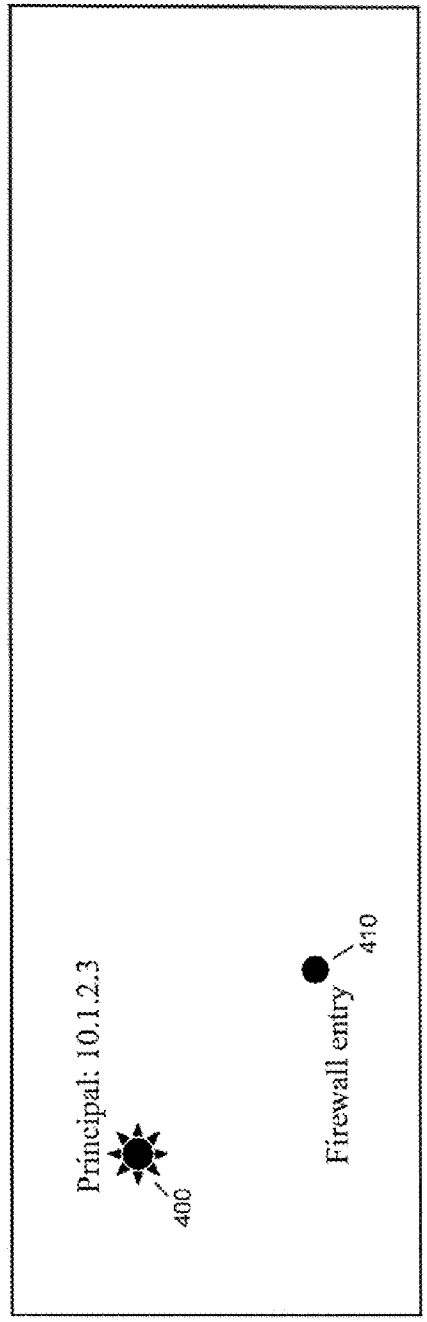
FIGS. 4A-F are simplified illustrations of a session as behavior is observed and events are posted and stored in accordance with some embodiments of the disclosed subject matter.
Figure 4B:
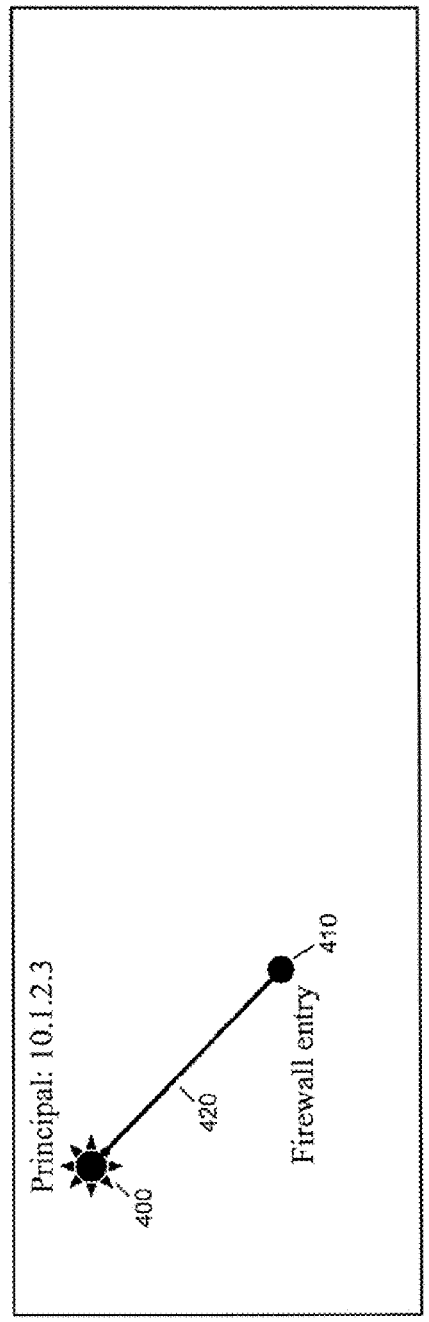
Figure 4C:
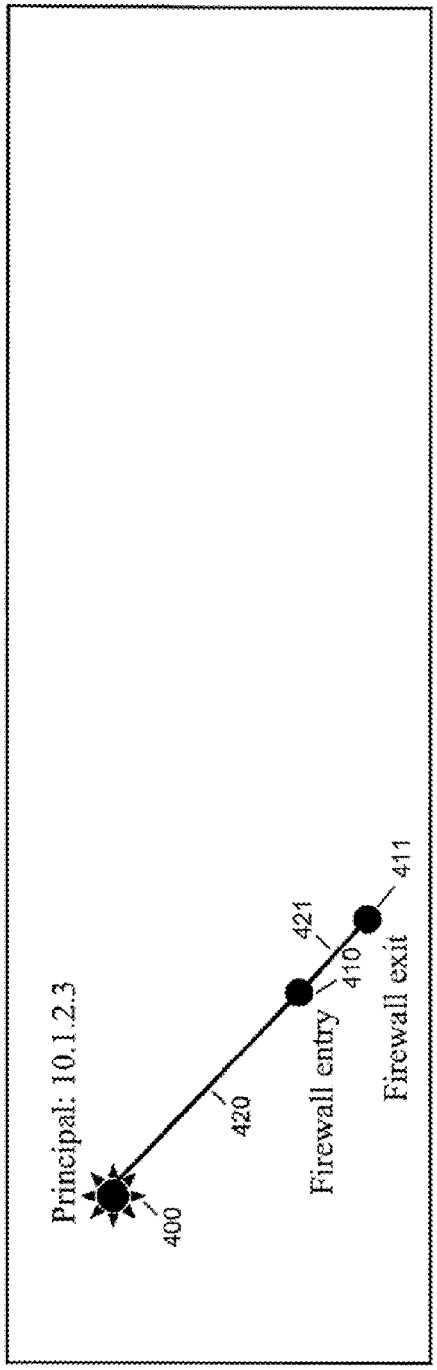
Figure 4D:
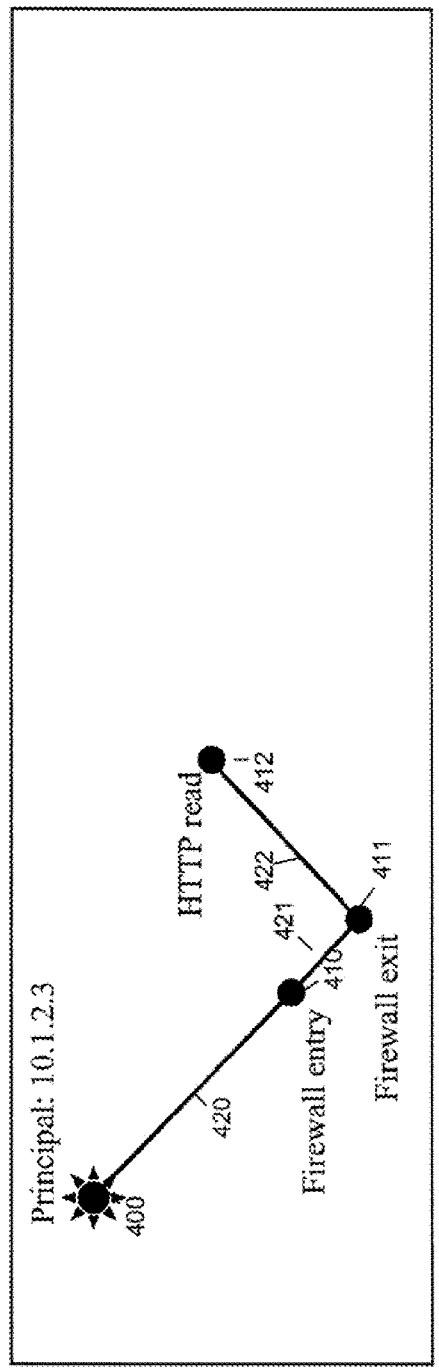
Figure 4E:
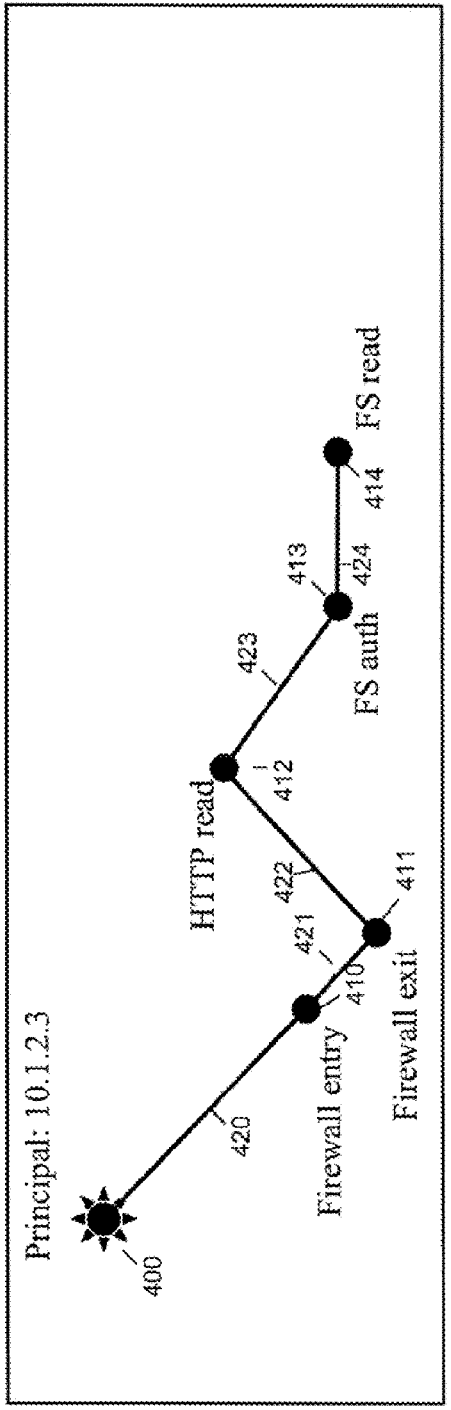
Figure 4F:
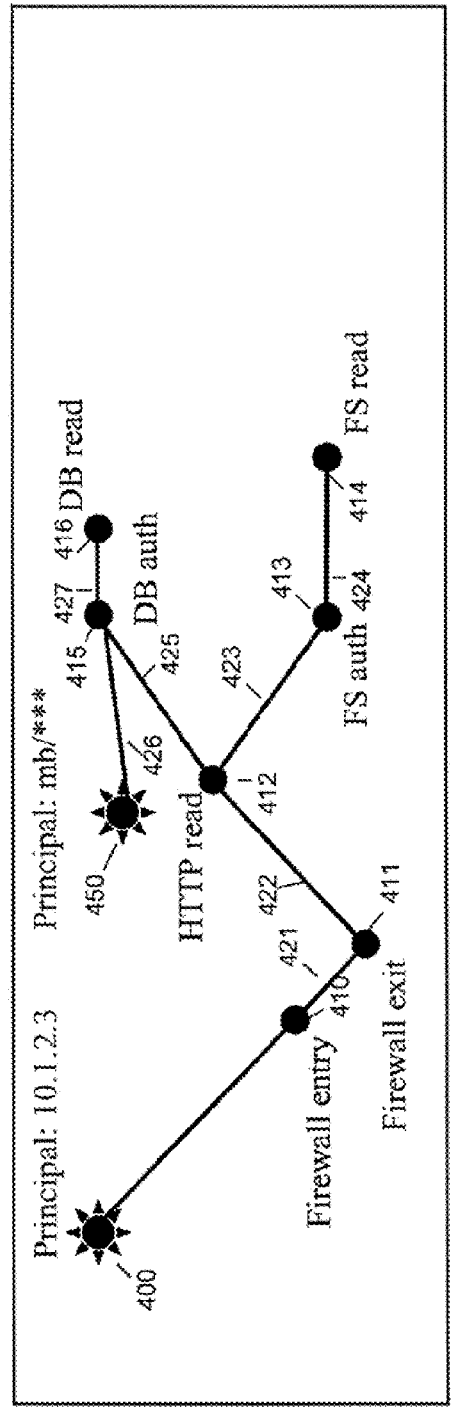
Figure 4G:
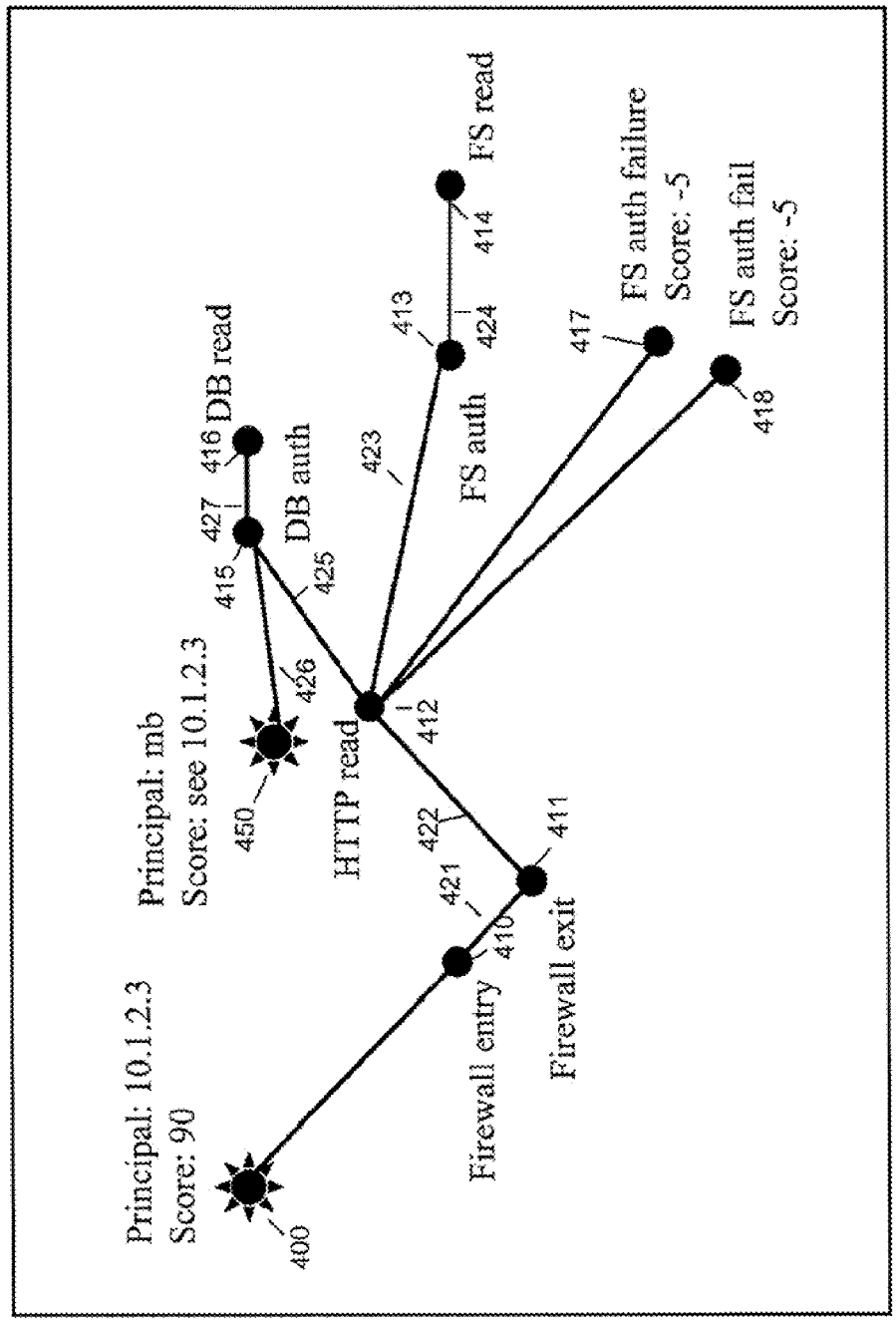
FIG. 4G is a simplified illustration of the session of FIGS. 4A-F illustrating penalty score events and a score of a principal reduced in response to the events in accordance with some embodiments of the disclosed subject matter.

FIGS. 4A-4F illustrate a graph of a session as it expands in response to observed behavior. Nodes represent principals and observed events. Links represent connections between nodes. FIG. 4A illustrates a principal 400 that has, for example, requested a connection to system 115 through interface 106. A sensor 120 posts a firewall entry event 410 when principal 400 reaches firewall 111. In FIG. 4B, a sensor 120 posts a link event 420 linking principal 400 and event 410. FIG. 4C illustrates a firewall exit event 411 and a linking event 421 posted by sensor due to principal 400 passing through firewall 111. In FIG. 4D, principal 400 requests a webpage from web server 111 and an HTTP read event 412 and a linking event 422 are posted. In response to the webpage request, fileserver 112 is accessed and, as illustrated in FIG. 4E, a file system authentication event 413, a file system read event 414, and a linking events 423 and 424 are posted. Later, principal 400 performs an action requiring database authentication and, as illustrated in FIG. 4F, a database authentication event 415 is posted as well as linking event 425. In this case, authenticating at the database requires a username/password combination, a user from principal 400 enters mb/** and a new principal, principal 450 is created. Linking event 426 linking links principal 450 and event 415. A database read event 416 is posted as well as linking event 427**. Nodes and links can be stored in various forms. For example, in some embodiments a node can be a data structure stored in a memory and a link can be a reference in the data structure of one node that identifies a data structure of another node.

Some embodiments can output a graph (e.g., such as the graphs of FIG. 4A-H) to, for example, a monitor. Graphs can be displayed as they are being built in response to the real-time actions occurring in a network. This can enable, for example, a system administrator to watch a session begin, grow, shrink, and terminate. A system administrator can also interact with the network through the displayed graph. For example, system administrator can observe a graph shape he considers malicious and can alter the underlying behavior causing the creation of the graph, by, for example, right clicking on an edge and instructing software to kill a related process. In another example, referring to FIG. 4F, edge 410 can be clicked on and an option such as "terminate 10.1.2.3." can be selected that causes firewall 110 to block principal 400 and kill all processes launched by principals 400, which can be executing on various devices.

In some embodiments, using the graph-based and/or path-based approaches described herein, the requests and system interactions can be monitored and corresponding graphs or paths can be displayed and/or outputted. The graphs or paths can be transmitted to a particular user (e.g., system administrator), where the user can edit each graph or path. For example, the requests and system interactions can be recorded by the system and multiple graphs based on the requests and system interactions can be generated. The multiple graphs can be transmitted to a system administrator at an administrator computer, where the system administrator can add annotations, remove edges, and/or perform any other suitable action. In response, the edited graphs can be used to create an actual security policy and/or shape particular policy rules within the security policy.

Some embodiments can treat multiple principals as one principal. For example, in FIG. 4G, principal 400 starts with a score of 100, but ends up with a score of 90 due to two file system authentication failure events (417 and 418) posted as a result of attempted accesses on files for which access permission was not allowed. In this example, principal 450 and principal 400 are linked (because there is a path between them) and thus, some embodiments treat them as if an action by either of them affects both (e.g., because the same user is behind both of them). Some embodiments deal with this by having, for example, the score of a later principal (e.g., principal 450) refer to the score of the earlier principal (e.g., principal 400), as illustrated at 451. In other embodiments, each principal is given a score, but penalties are assessed on each of the scores (e.g., each score can be lowered to 90). In other embodiments, the principals can be treated separately, but activities in a session connected to those principals can be treated as having the lowest score of the principals.

In some embodiments, a principal can be shared by multiple users. For example, consider a web server that multiplexes requests over a single connection to a database where all incoming requests to the database share the same key, and hence, in this example, the same principal. This creates the possibility for an adversary to mount a denial-of-service attack by misbehaving and driving down the score of that key. To avoid this, in some embodiments, a shared principal can be registered with policy engine 250 so that it can reduce the weight of the score of the shared principal (or ignore it all together) when calculating the behavioral score for a session. For example, the key of the aforementioned web server can be registered with the policy server as a shared principal. By registering that key with the policy engine, it can be factored in accordingly (e.g., in determining penalties and/or in determining which principals to hold responsible for behavior). In some embodiments, users using a shared principal can be distinguished by, for example detecting similar or repeated behavior, for example, through queries on the event database 220.

A related situation is the case where multiple principals are controlled by a single hidden individual, such as the case of a botnet. In this case, IDS sensors that can detect, for example, distributed denials-of-service (DDoS) attacks and multi-source port scans, can be used to generate a meta-principal with linkages to the principals performing the attack. Each transgression taken by the individual principals can also be deducted from the score of the meta-principal and the group as a whole can be punished. For example, referring to FIG. 4F, if many principals 400 (each with a different IP address) all performed actions in the same or similar pattern causing events like 410, 411, 412, 413, and 414 to posted at the same or similar time, an IDS can detect this and the various principals 400 can be, for example, treated as sharing a score. In some embodiments, links can be created between the various principals 400 and stored in database 225.

In some embodiments, the graphs of sessions can be examined to determine whether they indicate malicious behavior. For example, the shape of a graph can be examined. The term "shape" can include not only the arrangement of the vertices and edges, but also attributes associated with the vertices and edges. The shape of a session can be compared to known shapes, stored as, for example, a white list, a black list, and a grey list. The white list can include a number of known benign sessions and if the graph of an observed session matches a shape in the white list, it can be considered benign. Conversely, the black list can include a number of known malicious sessions and if the graph of an observed session matches a shape in the black list, it can be considered malicious. A graph that may appear on a white list can be one that came from, for example, an external principal, connected to a web server on port 80 (where port 80 is an attribute of a "connected to the firewall" event) and which then made a query on a database machine, where attributes of that query included that the query is a SELECT-type SQL request, and that the query arrived at the database on port 3389. A graph for that same network that may appear on a blacklist is one that came from an external principal connected to an event with an attribute indicating that it is a JOIN-type SQL request. However, there is no event generated by the web server, which indicates that this session did not pass through the web server (and, in this example, will thus be considered malicious).

Figure 5A:
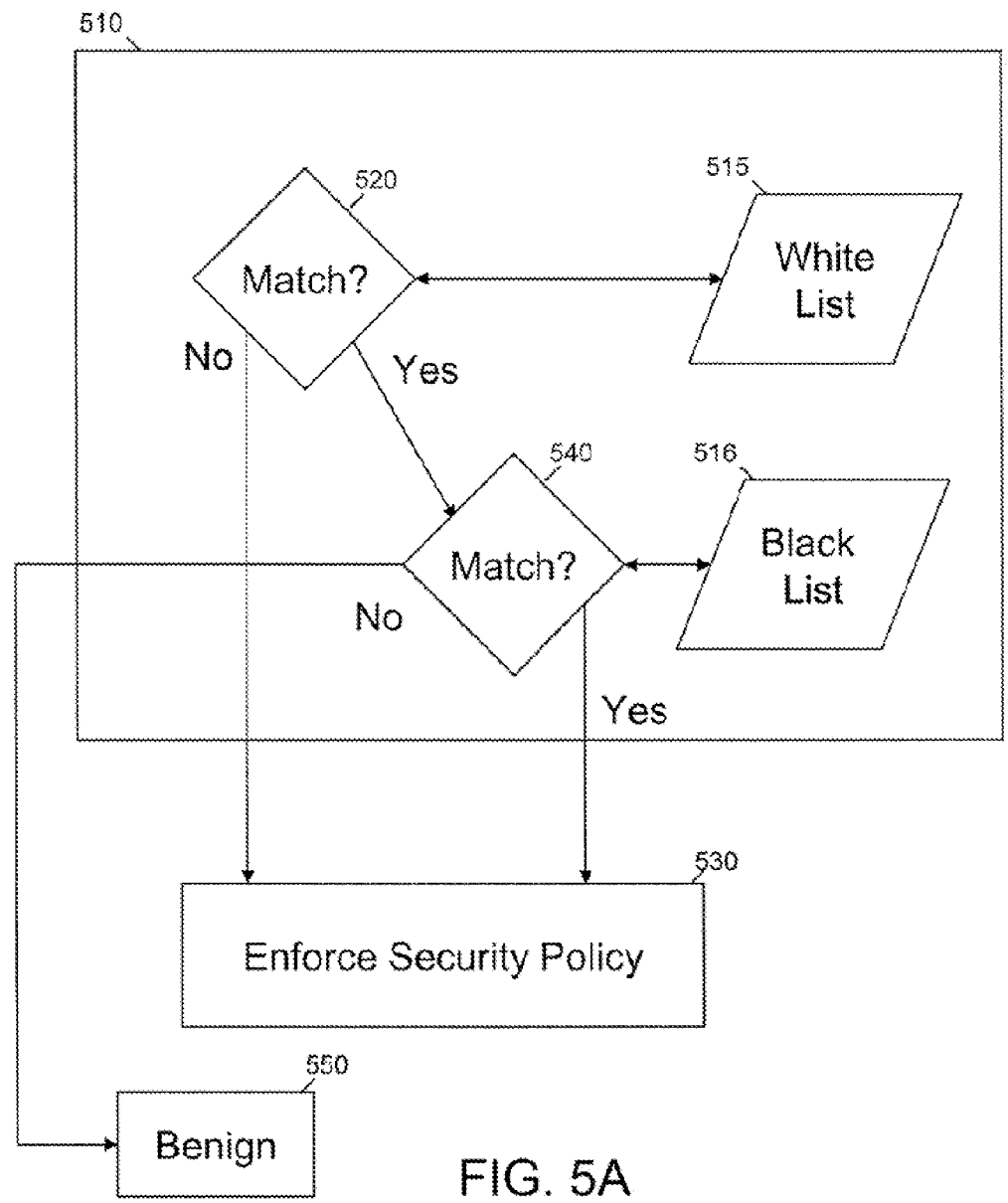
FIG. 5A is a simplified illustration of method for comparing a shape of a graph to the shapes of known benign and known malicious graph shapes in accordance with some embodiments of the disclosed subject matter.

For example, FIG. 5A illustrates a method of comparing, at 510, a graph shape to a security policy. If the shape does not match, at 520, a shape in white lists 515, the graph can be considered anomalous and the session and/or principals connected to the graph can be punished, at 530. If the shape matches a shape the white lists 515, at 520, the shape can be compared, at 540, to black list 516. If the shape matches the shape of a graph in black lists 516, the graph can be considered anomalous and the session and/or principals connected to the graph can be punished, at 530. If the shape of the graph does not match a shape of a graph in black lists 516, the graph can be considered benign, at 550. In some embodiments, if a graph shape changes from, for example, malicious to benign (e.g., from appearing on the black list to appearing on the white list), the session associated with the graph can be rewarded. In some embodiments, a graph shape matching white list 515, at 520, can be considered benign, at 550, without checking, at 540, black list 516.

In some embodiments, if the graph of an observed session does not match a shape in either the white list or the black list, the session can be referred to as grey. Grey sessions can be handled using various systems and methods. For example, some embodiments can treat a grey sessions as either benign (which may have a tendency to allow malicious sessions to pass) or to treat them as malicious (which may have a tendency to reject benign sessions). Some embodiments handle grey sessions using high scrutiny, for example, by allowing them to interact with a honeypot system instead of the real system using, for example, systems and methods of U.S. patent application Ser. No. 11/870,043, filed Oct. 10, 2008, which is hereby incorporated by reference herein in its entirety.

In a more particular example, graphs of incoming requests can be compared to graphs of policy rules. That is, a policy can be a wildcard-based set of predefined session graphs, pathways, etc. Each entry in the set is associated with an actuator 140 to be triggered in response to matching a policy rule. As sessions for incoming requests are built, the incoming requests can be evaluated against the set of rules in the policy. For example, if an incoming request graph is determined to be isomorphic with one of the graphs of the policy rules, the policy engine (e.g., policy engine 250) can perform a wildcard match of the attributes of the corresponding vertices. If the wildcard match succeeds, the actuator 140 associated with the policy rule can be triggered.

For example, as shown in FIGS. 5B and 5C, graphs of incoming requests 560 can be compared against graphs of policy rules 570. It should be noted that each vertex of the graphs has an associated set of attributes.

As shown in FIG. 5C, policy rule graph 572 describes the allowed pathway for requests on a particular web server. In particular, policy rule graph 572 allows requests that pass through the firewall (fw) to the web server (web) and onto the database (db) and the file server (fs). The attributes associated with each vertex can further restrict allowed requests to, for example, particular file sets on the web server or tables on the database. As also shown in FIG. 5C, policy rule graph 574 describes the allowed pathway for logging onto an SSH server using LDAP authentication, policy rule graph 576 describes the allowed pathway for sending e-mail, and policy rule graph 578 describes the allowed pathway for obtaining files from a particular FTP server.

Referring back to FIG. 5B, as each incoming request is processed by the network, the session database models the incoming request. For example, as shown in FIG. 5B, graphs of incoming requests 560 can be generated.

Graphs of incoming requests 560 are compared with the graphs of policy rules 570. In the comparison, if one of the graphs of the incoming requests 560 deviates from the graphs of the policy rules 570, the incoming request can be rejected. For example, as shown in FIG. 5B, incoming request graph 562 is allowed as it matches policy rule graph 572. In another example, incoming request graph 564 is rejected immediately as it does not match any of policy rule graphs 570. In yet another example, incoming request graph 566 matches the beginning portion of policy rule graph 576 and, in response, is initially allowed access. However, in response to deviating from policy rule graph 576 (e.g., by attempting to connect to the database), incoming request 566 is rejected.

In a more particular example, incoming request graph 566 corresponds to the scenario where an attacker has delivered an exploit against the mail daemon and attempts to use it as a launching point to probe the database. As soon as the attacker sends a request that deviates from one of the policy rules 570, the reject actuator is triggered. It should be noted that, as the session database stores the details of this connection, the actuator assigned to reject the connection is able to reject it simultaneously from the database, the mail daemon, and the firewall.

Some embodiments can use scoring, as described above, but only for grey sessions. For example, if a session matches the white list, it is considered benign; if a session is on the black list, it is considered malicious; and if a session is not on either list, it is analyzed using scoring as described above. In such embodiments, scoring can be performed as the session is running, but the score can be ignored unless the session is considered grey. Some embodiments can calculate a distance between shapes that do not match exactly, using, for example, statically methods and/or an IDS. For example, an observed shape that is within a certain distance of a shape in the white list can be considered benign.

FIG. 6 illustrates an example log file 600 of event activity including (6010-6160) events posted by sensors 120 at firewall 110 in response to those sensors observing behavior at firewall 110 in accordance with some embodiments. The first number, on lines with numbers, is a unique identifier for the event (e.g., the number at 6061 identifies event 6060). The details of each event follow its ID (e.g., "principal: [100] [ ] 128.59.23.218" are the details of event 6060). Log 600 illustrates communication passing through a firewall. At 6010, a new sensor for detecting links between events comes online. At 6020, an informational message is generated indicating a sensor for observing one of the firewall's network interfaces has come online. At 6030, an informational message is generated indicating a sensor for observing another of the firewall's network interfaces has come online. At 6040, an informational message is generated indicating a sensor for observing the firewall application (in this example, the OpenBSD pf firewall) has come online. At 6050, an informational message is generated indicating that all sensors are now online. At 6060, a request from IP 128.59.23.218 has arrived at firewall 110 and, in response, an outside interface sensor generates an event indicating a new principal has appeared. This event has ID 43227004, and the [100] indicates that this event will not deduct from the score of the principal. At 6070, the outside interface sensor observes a new IP address in the destination of the request. In this example, the IP address of firewall 110 itself is 128.59.21.161, so it generates a corresponding event dc1903c8. At 6080, another principal is discovered, this time a TCP/IP principal including the source IP and TCP port 128.59.23.218:41229, which is linked to the principal 128.59.23.218. At 6090, another TCP/IP principal is discovered including the destination IP and TCP port 128.59.21.161:80. At 6100, an informational message is generated indicating that a linkage engine has made all linkages from the current set of events available to it. Message 6100 further indicates that the linkage engine is pausing its operation until more events arrive.

The log file can also include information describing the direction of communications. For example, at 6110, the outside interface sensor 'if' generates event b10f4db6 indicating that 128.59.23.218:41229 is sending a request to 128.59.21.161:80 with TCP/IP sequence number 2748218242, and this event is linked to principals 128.59.23.218:41229 and 128.59.21.161:80. At 6120, a new principal has been discovered, in this case the internal web server at 10.0.0.11. At 6130, a new principal 10.0.0.11:80 is linked to the principal 10.0.0.11. For subsequent events, note that they were logged out of order; this is a property of the example logging system and does not indicate the order they were generated. At 6140, the internal interface connecting to the web server generates an event indicating the request has left the firewall and is now traveling to 10.0.0.11:80 on the web server. This event is linked to principals 128.59.23.218: 41229, 10.0.0.11:80 and event b10f4db6. At 6150, the interface sensor generates an informational message indicating that it has notified the interface sensor at the remote host (the web server) that the incoming request should be linked to event 94b0f8d0. At 6160, the pf sensor has generated an event indicating that an incoming request from 128.59.23.218:41229 is being redirected ('rdr') to 10.0.0.11: 80 with TCP sequence number 2748218242 and this event is linked to 128.59.23.218:41229, 10.0.0.11:80, b10f4db6 and 94b0f8d0.

FIG. 7 illustrates a log file of events (7010-7120) posted by various web server sensors in response to those sensors observing behavior at web server 111. At 7010, a sensor for detecting links between events comes online. At 7020, an informational message is generated indicating a sensor for observing the web server application ('httpd') has come online. At 7030, an informational message is generated indicating a sensor for observing the web server's network interfaces has come online. At 7040, an informational message is generated indicating that all sensors are now loaded. At 7050, an event for new principal 128.59.23.218 is generated. At 7060, an event for a new principal 10.0.0.11 is generated. At 7070 and 7080, the IP principals are linked to new TCP/IP principals with corresponding IP addresses and TCP ports. At 7090, an informational message is generated indicating that no further linkages can take place at this time. At 7100, the interface sensor ('if') generates event 28c1348e indicating that 128.59.23.218:41229 is making a request on 10.0.0.11: 80 with TCP sequence number 2748218242, and this event is linked to 128.59.23.218:41229 and 10.0.0.11:80. At 7110, an informational message is generated indicating the receipt of the rlink message from the previous log, linking event 94b0f8d0 from FIG. 6 to the current session. At 7120, the httpd sensor generates an event 06e1f8a9 indicating that 128.59.23.218:41229 has made a 'get' request on the web server, and the web server responded with a [not implemented] error. (Apache requires 'GET') Returning to FIG. 6, the packet departing the firewall for the web server, as described by event 6160, has ID number "94b0f8d0." It can be determined that event 6160 is linked to event 7120 (the failing 'GET' command) because of the inclusion of ID number 94b0f8d0 in event 7120. Principal 128.59.23.218 (the principal identified in event 606) can be punished for the failing 'GET' command described in event 7120.

In accordance with some embodiments, path-based access control can be provided to defend networks against a class of attacks wherein individual services make correct access control decisions, but the resulting global network behavior is incorrect. More particularly, information relating to access-control-related events can be forwarded at each service to subsequent or neighboring services. Accordingly, in addition or alternatively to the graph comparison approach described above, a policy engine (e.g., policy engine 250) that is co-located with each service can use accumulated information related to access-control-related events to detect pathway-violation attacks.

At each service, a sensor (e.g., sensor 120) monitors information regarding access-control events and forwards that data to downstream nodes. Such data can be packetized, where each packet is an event. For example, a sensor for an Apache web server can parse the Apache log and error files for reports on authorization attempts. Each entry for an authorization attempt in the log files is an event. The details of the particular event can be associated with it as a set of attribute key-value pairs and can be reported to downstream services.

In some embodiments, correlation sensors can be provided that correlate events on a hop-by-hop basis. For example, the events generated by the Apache server are correlated with packets departing the firewall based on the time, the source port, the IP address, and the TCP sequence number. The data set received by a downstream node is a chain linking the incoming request with the source principal and all intermediate hops in the network. Accordingly, the policy decision made at a given service can incorporate the additional information obtained from upstream nodes.

It should be noted that, as a request propagates through a network, the associated events are forwarded along with it. As described previously, a graph or a path of a session can be generated, where the vertices represent session-related events generated by one or more sensors and/or where the correlation information generated by the correlation sensors can be used to form edges between them. The path represents the route a request has taken from its entry point in the network to a given host. When a request arrives at a service, it is also accompanied by a graph representing the history of its interaction with the network. It is determined whether the graph representing an incoming connection matches a policy graph in order for the connection to be accepted.

It should further be noted that, in a service-oriented architecture, the path of interaction followed by a request is a tree, where the root of the tree is the first point of interaction with the network (e.g., a firewall) and the branches of the tree represent the various actions taken by the various services in the network in response to that request. Enforcing policy includes examining each pathway to determine that it follows a proscribed route. The tree or the graph is acyclic, thereby the policy takes the form of a list of services over which the request traverses and valid values for the key-value pairs associated with each event. Accordingly, a request taking an unexpected pathway of with non-matching attributes can be detected and rejected. For example, the policy evaluation at a particular node can include a traversal of the graph transmitted from the upstream node to verify that each node appears and is in the correct order.

It should also be noted that, as a request propagates through a network, the events generated by the sensors associated with it represent the path of that request. By providing correlation sensors between hosts and between services, the graph can be propagated across the network. Each node in the graph receives the access control decision made by all of its upstream nodes, which can be used to inform future access control decisions.

Accordingly, systems, methods, and media for path-based access control can be provided.

In accordance with some embodiments, a trust-management system (e.g., a KeyNote system) can be deployed on the network to enhance the path-based access control approaches. For example, some embodiments can be vulnerable to malicious internal nodes, where a compromised or other malicious intermediate node on the path between an application and the entry point for a request can modify the graph dataset before forwarding it (e.g., to a neighboring node). Accordingly, cryptographic tools and/or trust-management capabilities of the trust-management system can be used to build a certificate chain representing the path taken by a request from its entry in the network to a given host.

In the trust-management system, events can be reported in the form of trust-management credentials and the policy can be evaluated at each service by a compliance checker (e.g., a KeyNote compliance checker). For example, when a request generates an event $e_1$ at host $H_1$ and the request is then forwarded to a host $H_2$, where it generates an event $e_2$ and a correlation sensor correlates the events. Here, the correlation notification takes the form of a KeyNote credential or any other suitable trust-management credential. It is a signed assertion, with authorizer $H_1$ and licensee $H_2$, indicating that $e_1$ and $e_2$ are linked. The following credential can be issued by a firewall when it redirects an incoming request to a web server:

```
KeyNote-Version: 2
    Comment: Forward request to web server
    Local-Constants:   FW_key = "RSA:acdfa1df1011bbac"
                       WEB_key = "RSA:deadbeefcafe001a"
    Authorizer: FW_key
    Licensees: WEB_key
    Signature: "RSA-SHA1:f00f2244"
    Conditions: . . .
```

It should be noted that the Conditions field can be used to encapsulated references to events e1 and e2. Credentials are chained such that the licensee for each event is designated as the next hop in the graph. For example, in an e-commerce example, an event generated at a web server and passed to the database can include the above-mentioned credential along with the following:

```
KeyNote-Version: 2
    Comment: Send SQL SELECT statement to the DB
    Local-Constants:   WEB_key = "RSA:deadbeefcafe001a"
                       DB_key = "RSA:101abbcc22330001"
    Authorizer: WEB_key
    Licensees: DB_key
    Signature: "RSA-SHA1:baba3232"
```

The first link of the credential chain is created by the firewall. This credential binds the principal (the TCP/IP address of the incoming connection) to the first hop in the chain. The key for the principal is randomly generated, and then cached, at the firewall. Such an exemplary credential can be described as:

```
KeyNote-Version: 2
    Comment: New principal at the firewall
    Local-Constants:   P_key = "RSA:ffeedd22eecc5555"
                       FW_key = "RSA:acdfa1df1011bbac"
    Authorizer: P_key
    Licensees: FW_key
    Conditions: hop0 == "PRINCIPAL"
    Signature: "RSA-SHA1:ceecd00d"
```

As a request propagates through the network, the result is a chain of credentials that link the incoming request at a given node back through each intermediate node to the principal. The policy at each node is a list of keys, in order, that are found in the credential chain. As the set of credentials arrives at each node, the local KeyNote compliance checker or any other suitable trust-management compliance checker determines that the set includes a chain. If successful, the policy engine then traverses the chain to determine whether the keys occur in the order expressed. For example, policy evaluation includes a verification or determination that the credential chain is, in fact, a chain and then a search of that chain for the policy key list. If either fails, the request is blocked.

It should be note that the above-mentioned trust-management credentials and keys generated by the trust-management system are illustrative. For example, the trust-management credentials and/or the keys generated by a KeyNote trust-management system can be much longer as the values shown above are merely placeholder values.

Accordingly, systems, methods, and media for enhancing path-based access control with a trust-management system can be provided.

Figure 8:
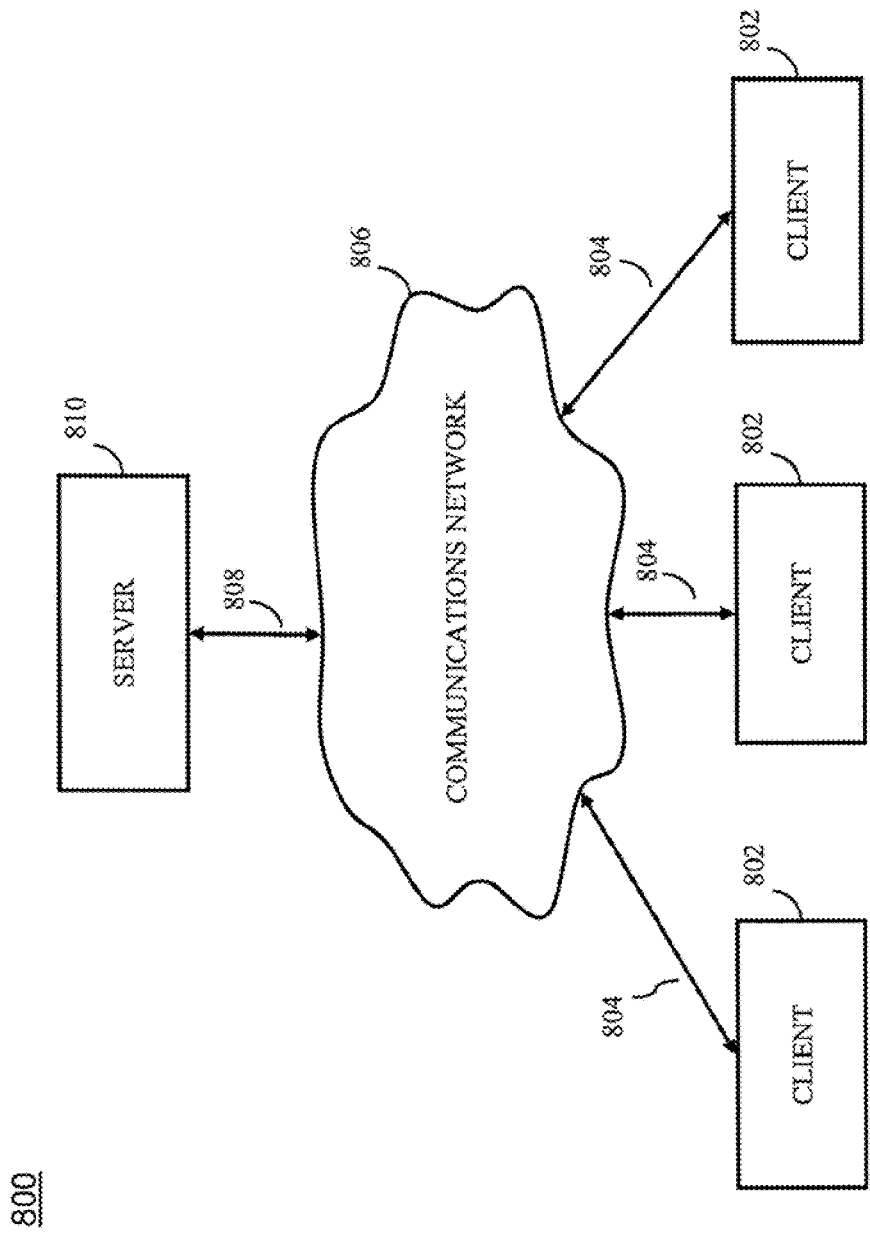
FIG. 8 is a simplified illustration of a system that can be used to implement the system of FIG. 1 in accordance with some embodiments of the disclosed subject matter.

FIG. 8 is a schematic diagram of an illustrative system 800 that can be used to enforce a security policy in a network including a plurality of components in accordance with some embodiments of the disclosed subject matter. As illustrated, system 800 can include one or more clients 802. Clients 802 can be connected by one or more communications links 804 to a communications network 806 or connected directly to each other. Communications network 806 can also be linked through a communications interface 808 to a server 810. Various embodiments of the disclosed subject matter can be implemented on at least one of the server and the clients. It is also possible that a client and a server can be connected through communication interfaces 808 or 804 directly and not through a communication network 806.

In system 800, server 810 can be any suitable digital processing device for executing an application, such as, for example, a processor, a computer, a data processing device, or a combination of such devices. Communications network 806 can be various networks including the Internet, an intranet, a wide-area network (WAN), a local-area network (LAN), a wireless network, a frame relay network, an asynchronous transfer mode (ATM) network, a virtual private network (VPN), a mobile ad-hoc network (MANET), etc. or any combination of any of the same. Communications interfaces 804 and 808 can be any communications interfaces suitable for communicating data between clients 802 and server 810, such as network links, dial-up links, wireless links, hard-wired links, etc. or any combination of any of the same. Clients 802 can be any suitable digital processing devices, such as, for example, personal computers, laptop computers, mainframe computers, data displays, Internet browsers, personal digital assistants (PDAs), two-way pagers, wireless terminals, portable telephones, etc., or any combination of the same. In some embodiments, clients 802 and server 810 can be located within an organization. Alternatively, clients 802 and server 810 can be distributed between multiple organizations.

Figure 9:
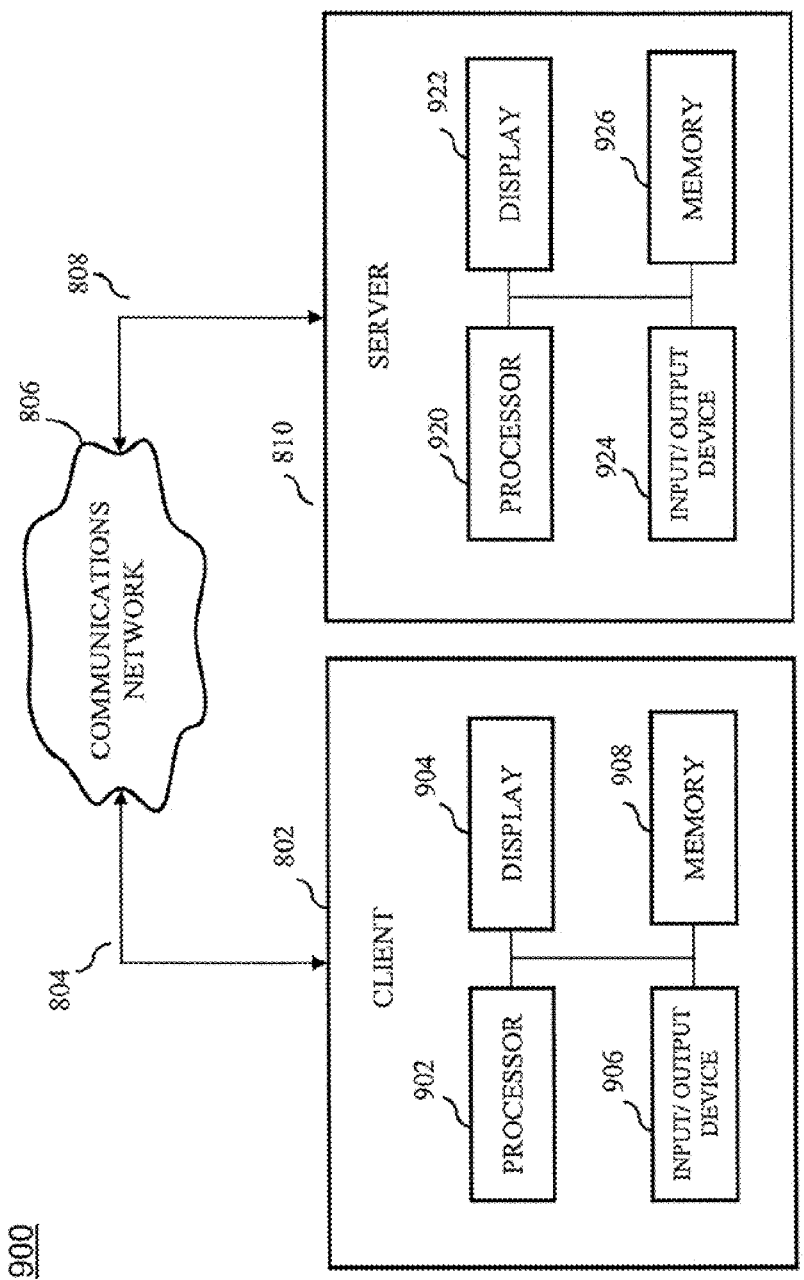
FIG. 9 is a more detailed illustration of a client and the server of FIG. 2 that can be used in accordance with some embodiments of the disclosed subject matter.

Server 810 and one of the clients 802, which are depicted in FIG. 8, are illustrated in more detail in FIG. 9. Referring to FIG. 9, client 802 and server 810 can include respectively, among other things, processors 902 and 920, displays 904 and 922, input/output devices 906 and 924, and memory 908 and 926, which can be interconnected. The input/output devices can receive input and send output such as, for example, text from keyboard, images from a camera, images from a scanner, audio recordings, voice-to-text translations, network traffic, packets, etc. In some embodiments, memory 908 and/or 926 contain a storage device for storing a program for controlling processors 902 and 920 and/or performing methods such as those described herein. Variations and combinations of system 900 can be suitable for different embodiments of the disclosed subject matter. In addition, although some embodiments are described herein as being implemented on a client and/or a server, this is only illustrative.

Various components of some embodiments of the disclosed subject matter can be implemented on any suitable platform. For example, system 100 of FIG. 1 can be implemented on a client 802, a server 810, or various combinations of clients 802 and servers 810. Any of sensors 120, actuators 140, firewall 110, web server 111, and database 112 can be implemented on various combinations of clients 802 and servers 810. A security policy can be stored, for example, in a memory 908 and/or 926. In some embodiments, communications network 806 can be network 105 of FIG. 1 or be in communication with network 105.

More particularly, for example, each of the client 802, server 810, sensors 120, actuators 140, firewall 110, web server 111, and database 112 can be any of a general purpose device such as a computer or a special purpose device such as a client, a server, etc. Any of these general or special purpose devices can include any suitable components such as a processor (which can be a microprocessor, digital signal processor, a controller, etc.), memory, communication interfaces, display controllers, input devices, etc. For example, client 802 can be implemented as a personal computer, a personal data assistant (PDA), a portable email device, a multimedia terminal, a mobile telephone, a set-top box, a television, etc.

In some embodiments, any suitable computer readable media can be used for storing instructions for performing the processes described herein, can be used as a content distribution that stores content and a payload, etc. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways within the scope and spirit of the invention.

What is claimed is:

1. A method for enforcing a security policy in a network including a plurality of components, the method comprising:
   receiving a plurality of events describing component behavior detected by a plurality of sensors, each sensor monitoring a different component of the plurality of components;
   attributing a first event of the plurality of events to a first principal;
   attributing a second event of the plurality of events to a second principal;
   determining whether the first and second events are correlated;
   storing a data structure that attributes each of the first and second events to the first principal, if it is determined that the first and second events are correlated;
   comparing the second event to the security policy; and
   modifying network behavior to enforce the security policy against the first principal based on the comparison of the second event to the security policy and the attribution of the second event to the first principal.

2. The method of claim 1, wherein the modifying of the network behavior includes at least one of: killing a process, dropping a connection, denying access to at IP address, increasing logging, issuing a warning, and locking, a user name.

3. The method of claim 1, wherein at least one of the first principal and second principal include at least one of an address, a username, a key, a token, and/or a physical identifier.

4. The method of claim 1, wherein the determining whether the first and second events are correlated comprises comparing the first event and the second event to extract common event information.

5. The method of claim 4, wherein the common event information comprises at least one of a sequence ID number, a process ID number, a port ID, and a MAC address.

6. The method of claim 1, wherein the determining whether the first and second events are correlated is based on at least one of timing relationships, function-call graphs, and taint graphs.

7. The method of claim 1, wherein the first principal corresponds to an IP address, and the second principal corresponds to a user name.

8. The method of claim 7, wherein the first event describes firewall entry, and the second event describes detection of an incorrect password.

9. The method of claim 7, wherein the modifying of the network behavior includes at least one of killing a process, dropping a connection, denying access to the IP address, increasing logging, issuing a warning, and locking the user name.

10. The method of claim 1, wherein the data structure comprises a graph including at least one node representing a principal and at least one link connecting the principal to an event node.

11. The method of claim 10, further comprising:
outputting the graph to a display; and
receiving an input from a user to request the modification of the network behavior to enforce the security policy against the first principal.

12. The method of claim 10, wherein the comparing of the second event to the security policy comprises determining whether the graph indicates malicious behavior by comparing the graph to at least one known malicious graph.

13. The method of claim 10, wherein:
the comparing of the second event to the security policy comprises calculating at least one distance score based on a comparison of the graph to at least one known malicious graph or at least one known benign graph; and
the modifying of the network behavior to enforce the security policy against the first principal is based on the at least one distance score.

14. The method of claim 1, wherein the data structure comprises a graph including a node representing the first principal, a node representing the second principal, and at least one link connecting at least one of the first principal and the second principal to an event.

15. The method of claim 1, wherein the data structure comprises a graph including:
a node for the first principal;
a node for the first event, which is connected to the node for the first principal by at least one link;
a node for the second principal;
a node for the second event, which is connected to the node for the second principal by at least one link; and
at least one link connecting the second event the first event.

16. The method of claim 1, wherein the first principal has an associated score, the method further comprising:
determining a penalty value based on the second event; and
decreasing the score of the first principal by the penalty value.

17. The method of claim 16, further comprising:
providing rehabilitation instructions to an entity associated with the first principal;
receiving notification that the rehabilitation instructions have been complied with; and
increasing the score of the first principal based on the compliance.

18. A system for enforcing a security policy in a network including a plurality of components, the system comprising:
a hardware processor configured to:
receive a plurality of events describing component behavior detected by a plurality of sensors, each sensor monitoring a different component of the plurality of components;
attribute a first event of the plurality of events to a first principal;
attribute a second event of the plurality of events to a second principal;
determine whether the first and second events are correlated;
store a data structure that attributes each of the first and second events to the first principal, if it is determined that the first and second events are correlated;
compare the second event to the security policy; and
modify network behavior to enforce the security policy against the first principal based on the comparison of the second event to the security policy and the attribution of the second event to the first principal.

19. The system of claim 18, wherein modifying, the network behavior includes at least one of: killing a process, dropping a connection, denying access to an IP address, increasing logging, issuing a warning, and locking a user name.

20. The system of claim 18, wherein at least one of the first principal and second principal include at least one of an address, a username, a key, a token, and/or a physical identifier.

21. The system of claim 18, wherein the hardware processor is further configured to compare the first event and the second event to extract common event information.

22. The system of claim 21, wherein the common event information comprises at least one of a sequence ID number, a process ID number, a port ID, and a MAC address.

23. The system of claim 18, wherein the determining whether the first and second events are correlated is based on at least one of timing relationships, function-call graphs, and taint graphs.

24. The system of claim 18, wherein the first principal corresponds to an IP address, and the second principal corresponds to a user name.

25. The system of claim 24, wherein the first event describes firewall entry, and the second event describes detection of an incorrect password.

26. The system of claim 24, wherein the modifying of the network behavior includes at least one of: killing a process, dropping a connection. denying access to the address, increasing logging, issuing a warning, and locking the user name.

27. The system of claim 18, wherein the data structure comprises a graph including at least one node representing a principal and at least one link connecting the principal to an event node.

28. The system of claim 27, wherein the hardware processor is further configured to:
output the graph to a display; and
receive an input from a user to request the modification of the network behavior to enforce the security policy against the first principal.

29. The system of claim 27, wherein hardware processor is further configured to determine whether the graph indicates malicious behavior by comparing the graph to at least one known malicious graph.

30. The system of claim 27, wherein:
the comparing of the second event to the security policy comprises calculating at least one distance score based on a comparison of the graph to at least one known malicious graph or at least one known benign graph; and
the modifying of the network behavior to enforce the security policy against the first principal is based on the at least one distance score.

31. The system of claim 18, wherein the data structure comprises a graph including a node representing the first principal, a node representing the second principal, and at least one link connecting at least one of the first principal and the second principal to an event.

32. The system of claim 18, wherein the data structure comprises a graph including:
a node for the first principal;
a node for the first event, which is connected to the node for the first principal by at least one link;
a node for the second principal;
a node for the second event, which is connected to the node for the second principal by at least one link; and
at least one link connecting the second event to the first event.

33. The system of claim 18, wherein the first principal has an associated score, the hardware processor further configured to:
determine a penalty value based on the second event; and
decrease the score of the first principal by the penalty value.

34. The system of claim 33, wherein the hardware processor is further configured to:
provide rehabilitation instructions to an entity associated with the first principal;
receive notification that the rehabilitation instructions have been complied with; and
increase the score of the first principal based on the compliance.

35. A non-transitory computer readable medium containing computer-executable instructions that, when executed by a processor, cause the processor to perform a method for enforcing a security policy in a network including a plurality of components, the method comprising:
receiving a plurality of events describing component behavior detected by a plurality of sensors, each sensor monitoring a different component of the plurality of components;
attributing a first event of the plurality of events to a first principal;
attributing a second event of the plurality of events to a second principal;
determining whether the first and second events are correlated;
storing a data structure that attributes each of the first and second events to the first principal, if it is determined that the first and second events are correlated;
comparing the second event to the security policy; and
modifying network behavior to enforce the security policy against the first principal based on the comparison of the second event to the security policy and the attribution of the second event to the first principal.

36. The computer-readable medium of claim 35, wherein the modifying of the network behavior includes at least one of: killing a process, dropping a connection, denying access to an IP address, increasing logging, issuing a warning, and locking a user name.

37. The computer-readable medium of claim 35, wherein at least one of the first principal and second principal include at least one of an address, a username, a key, a token, and/or a physical identifier.

38. The computer-readable medium of claim 35, wherein the determining whether the first and second events are correlated comprises comparing the first event and the second event to extract common event information.

39. The computer-readable medium of claim 38, wherein the common event information comprises at least one of a sequence ID number, a process ID number, a port ID, and a MAC address.

40. The computer-readable medium of claim 35, wherein the determining whether the first and second events are correlated is based on at least one of timing relationships, function-call graphs, and taint graphs.

41. The computer-readable medium of claim 35, wherein the first principal corresponds to an IP address, and the second principal corresponds to a user name.

42. The computer-readable medium of claim 41, wherein the first event describes firewall entry, and the second event describes detection of an incorrect password.

43. The computer-readable medium of claim 41, wherein the modifying of the network behavior includes at least one of killing a process, dropping a connection, denying access to the IP address, increasing logging, issuing a warning, and locking the user name.

44. The computer-readable medium of claim 35, wherein the data structure comprises a graph including at least one node representing a principal and at least one link connecting, the principal to an event node.

45. The computer-readable medium of claim 44, the method further comprising
outputting the graph to a display; and
receiving an input from a user to request the modification of the network behavior to enforce the security policy against the first principal.

46. The computer-readable medium of claim 44, wherein the comparing of the second event to the security policy comprises determining whether the graph indicates malicious behavior by comparing the graph to at least one known malicious graph.

47. The computer-readable medium of claim 44, wherein:
the comparing of the second event to the security policy comprises calculating at least one distance score based on a comparison of the graph to at least one known malicious graph or at least one known benign graph; and
the modifying of the network behavior to enforce the security policy against the first principal is based on the at least one distance score.

48. The computer-readable medium of claim 35, wherein the data structure comprises a graph including a node representing the first principal, a node representing the second principal, and at least one link connecting at least one of the first principal and the second principal to an event.

49. The computer-readable medium of claim 35, wherein the data structure comprises a graph including:
a node for the first principal;
a node for the first event, which is connected to the node for the first principal by at least one link;
a node for the second principal;
a node for the second event, which is connected to the node for the second principal by at least one link; and
at least one link connecting the second event to the first event.

50. The computer-readable medium of claim 35, wherein the first principal has an associated score, the method further comprising:
- determining a penalty value based on the second event; and
- decreasing the score of the first principal by the penalty value.

51. The computer-readable medium of claim 50, the method further comprising:
- providing rehabilitation instructions to an entity associated with the first principal;
- receiving notification that the rehabilitation instructions have been complied with; and
- increasing the score of the first principal based on the compliance.

* * * * *